United States Patent
Slama et al.

(10) Patent No.: US 9,993,835 B2
(45) Date of Patent: *Jun. 12, 2018

(54) INDUSTRIAL COATING APPLICATION FILTER WITH PLEATED SUPPORT

(71) Applicant: Columbus Industries, Inc., Ashville, OH (US)

(72) Inventors: Mounir B. H. Slama, Dublin, OH (US); James E. Large, Circleville, OH (US); Daniel J. Baizel, Wilmington, OH (US); Michael K. Haufe, Upper Arlington, OH (US)

(73) Assignee: Columbus Industries, Inc., Ashville, OH (US)

( * ) Notice: Subject to any disclaimer, the term of this patent is extended or adjusted under 35 U.S.C. 154(b) by 8 days.

This patent is subject to a terminal disclaimer.

(21) Appl. No.: 15/417,817

(22) Filed: Jan. 27, 2017

(65) Prior Publication Data

US 2017/0136483 A1    May 18, 2017

Related U.S. Application Data

(63) Continuation-in-part of application No. 14/246,669, filed on Apr. 7, 2014, now Pat. No. 9,555,358.

(60) Provisional application No. 61/808,946, filed on Apr. 5, 2013.

(51) Int. Cl.
| | |
|---|---|
| *B01D 46/00* | (2006.01) |
| *B01D 46/10* | (2006.01) |
| *B01D 46/52* | (2006.01) |

(52) U.S. Cl.
CPC ........... *B05B 14/43* (2018.02); *B01D 46/0001* (2013.01); *B01D 46/10* (2013.01); *B01D 2265/06* (2013.01); *Y10T 29/49826* (2015.01)

(58) Field of Classification Search
CPC ........ B01D 46/10; B01D 46/52; B01D 46/00; B01D 46/0001; B01D 2265/06; Y10T 29/49826
USPC .... 55/497, 498, 496, 499, 502, 521, DIG. 5, 55/DIG. 31, DIG. 46; 264/DIG. 48
See application file for complete search history.

(56) References Cited

U.S. PATENT DOCUMENTS

| | | |
|---|---|---|
| 3,075,337 A | 1/1963 | Andreae |
| 4,008,060 A | 2/1977 | Andreae |
| 4,894,073 A | 1/1990 | Andreae |
| 5,051,118 A | 9/1991 | Andreae |

(Continued)

*Primary Examiner* — Amber R Orlando
*Assistant Examiner* — Minh-Chau Pham
(74) *Attorney, Agent, or Firm* — Jason H. Foster; Kremblas & Foster

(57) ABSTRACT

A filter for industrial coating filtration systems. The filter has a housing made up of a peripheral wall extending around the periphery. The housing is preferably made of a suitably rigid material. A preferably rigid support backing is mounted within the housing. The support backing has a planar configuration with openings formed through it so that gas can flow through without substantial resistance. The preferably planar sheet of which the support backing is made is pleated. The pleated support backing defines a series of panels, each of which is angled to a next adjacent panel. Filtration media is mounted to the support backing, end caps are attached to the ends of the support backing to maintain the pleated configuration, and the assembly is inserted into the housing, which can have end flaps to seal using tape or adhesive.

21 Claims, 31 Drawing Sheets

(56) References Cited

U.S. PATENT DOCUMENTS

| | | |
|---|---|---|
| 5,779,747 A | 7/1998 | Schlor et al. |
| 6,790,397 B2 | 9/2004 | Richerson et al. |
| 9,555,358 B2 * | 1/2017 | Haufe .................... B01D 46/10 |
| 2004/0182055 A1 | 9/2004 | Wynn |
| 2008/0034718 A1 | 2/2008 | Schuld et al. |
| 2014/0150385 A1 | 6/2014 | Schuld et al. |
| 2014/0298764 A1 | 10/2014 | Haufe et al. |

* cited by examiner

INDUSTRIAL COATING APPLICATION FILTER WITH PLEATED SUPPORT

CROSS-REFERENCES TO RELATED APPLICATIONS

This application is a Continuation-In-Part of U.S. Non-Provisional application No. 14/246,669, filed Apr. 7, 2014 and now U.S. Pat. No. 9,555,358, which claims the benefit of U.S. Provisional Application No. 61/808,946 filed Apr. 5, 2013. These applications are hereby incorporated by reference.

STATEMENT REGARDING FEDERALLY-SPONSORED RESEARCH AND DEVELOPMENT (Not Applicable)

THE NAMES OF THE PARTIES TO A JOINT RESEARCH AGREEMENT (Not Applicable)

REFERENCE TO AN APPENDIX (Not Applicable)

BACKGROUND OF THE INVENTION

The invention relates generally to filters, and more particularly to filters made for applications where industrial coatings are applied.

Industrial coatings, such as automotive paint, are commonly applied to products in manufacturing facilities by spraying the products after placing the products in booths or stations that are separated from the rest of the manufacturing facility. Paint (which is a term used herein to include all industrial coatings) spraying creates "overspray" of atomized particles that do not adhere to the product's surface. Such particles are of various sizes, and can remain wet for some time. Therefore, in order to remove wet and dry overspray particles, paint arrestors are used to filter the air inside the paint booth prior to exhausting the air to the environment outside the paint booth.

Air filtration devices used in booths where painting by spraying is carried out are well known, such as in U.S. Pat. Nos. 3,075,337; 4,008,060; 4,894,073; 5,051,118; and 6,790,397. In these patents, which are incorporated herein by reference, methods and apparatuses are disclosed describing how to take the dry and/or wet particles in suspension out of a gaseous flow, generally air.

To purify such gaseous flows an "inertia" filter can be used. An inertia filter causes turbulence in the flow of gas that contains the paint particles, thereby projecting the suspended particles against the walls of the filters due to the particles' inability to flow around the walls of the filters (because of the inertia of the paint particles and the air). These filters are known in the industry to be sold by Andreae Team, Inc. of Ardmore, Okla. In inertia filters, the filters are of the pleated or accordion type and have walls made of air-impervious material, generally paperboard. These walls are connected along one or more folds and have different dimensions so that chambers are created between the walls. These walls have openings that are not aligned with each other along the direction of air flow. Thus, a turbulent flow of the gas is created within the chambers of the filter. This turbulent flow causes projection of the paint particles, due to the inertia of the particles, against the walls of the chambers where they are deposited. Inertia filters ensure a constant pressure drop over their lifetime but have the drawback that they do not retain small, light particles, the mass of which is insufficient for inertia to project them against the walls for deposition. For certain types of paint, particularly lacquers, these filters have an efficiency that cannot satisfy the more strict environmental standards.

Alternatively, filtration can be accomplished by screening/sieving, i.e. by passage of the gas and entrained particles through a porous media with tortuous paths causing impact of the particles with the media, and causing particles to be held when the particles encounter a tortuous path smaller than the particle. These filters typically do not retain dry particles having a size smaller than their pores. Thus, screening filters commonly have a low efficiency for paint particles. It is possible to make such filters with smaller pores to increase efficiency, but this introduces a substantial pressure drop across the media. Loading with particulate causes such screening filters to clog rapidly, thereby causing an increasing pressure drop, necessitating frequent replacement.

The filters now in use in this field have to be changed often, because government environmental standards generally require arrestance efficiencies greater than or equal to 98%. Filters that are able to meet these efficiency standards tend to require more frequent replacement due to filling with overspray more quickly. These filters are made by removable elements intended to be mounted in adapted frames, such as channels into which planar filter cartridges are inserted. The air flow is driven perpendicularly through the filter cartridges as in a residential heating, cooling and ventilation filtration system.

There is a need for an improved filter that has low pressure drop and high paint retention efficiencies, and that does not have to be replaced at a rate that either slows work substantially or causes the cost of use to be too high.

BRIEF SUMMARY OF THE INVENTION

Disclosed herein is a filter for industrial coating application filtration systems including, but not limited to, automotive painting systems. The filter has a housing made up of a peripheral wall, which extends around the entire periphery of the filter. The housing is preferably made of paperboard, corrugated paper, plastic or any other suitable material that remains rigid enough to retain its shape under the circumstances in an industrial coating application filtration system.

A backing may be placed within the housing to support a filtration media, and the support backing may be made of corrugated paperboard, although any suitable material will suffice. The support backing may have a planar configuration with large openings formed through it so that air can flow therethrough without substantial resistance. The planar sheet of which the support backing is made is bent along hinges to form a pleated configuration. In the pleated configuration, the support backing defines a series of panels, each of which is angled to next adjacent panels forming a plurality of generally V-shaped waves.

Prior to bending the support into the pleated configuration shown above, it is preferred that filter media be attached onto the support. In a preferred embodiment, the media is slit and expanded paper, and is more preferably multiple layers of slit and expanded paper disposed in a stacked configuration. Furthermore, it is contemplated to add a polymer filter media as a layer that air passes through last when traversing the media during normal operation in order to most effectively remove any matter that is desirably removed from the air. Of course, any filtration media may be used, and any single or combination of media may be used. For example, only paper and only polyester may be used.

The combination of the filter media and the attached support backing may be mounted to substantially planar end caps with slots through which tabs on the opposite ends of the support backing insert, although any suitable attachment mechanism is acceptable. The combination is then slid into the housing with a bottom end cap parallel to and adjacent the bottom wall of the housing and a top end cap parallel to the final (closed) position of the top wall of the housing. The flaps of the housing are similar to those on paperboard boxes and may be manually or automatically closed, as described below, and may function as the top and bottom walls. This configuration preferably causes some or all of the tabs to bend over, thereby forming an angle of about ninety degrees with the attached panels of the support backing from which the tabs extend. Thus, when the lid flaps are fastened over the bent tabs, it is essentially impossible for the tabs to be pulled out of the top and bottom end caps. Upon closing, the flaps are sealed in the closed position by any suitable fastener, such as tape.

Disclosed herein is a filter for a spray coating system. The filter comprises a housing including a peripheral sidewall having an inlet opening on a first side and an outlet opening on a second, opposite side of the housing. The inlet and outlet openings provide substantially no resistance to the flow of gas along a flow path extending through the housing from the inlet opening to the outlet opening. A support backing is disposed within the peripheral sidewall between the inlet and outlet openings. The support backing has at least a first substantially planar panel joined at a first edge to a first edge of a second substantially planar panel at a predetermined, non-parallel angle thereto. The first and second panels have openings formed therethrough to provide substantially no resistance to the flow of gas through the panels. A hinge is formed where the first edge of the first panel is joined to the first edge of the second panel, whereby the support backing may be collapsed by pivoting said first panel along the hinge relative to the second panel. Filtration material is attached to the support backing. First and second end caps are mounted within the housing to the support backing at opposite ends of the first and second panels and on opposite sides of the flow path transverse to the first edges of the first and second substantially planar panels. These end caps are for maintaining the first and second panels at the predetermined angle. The end caps have a plurality of preferential hinge lines formed thereon to permit the first and second end caps to collapse to a pleated configuration when the attached support backing is collapsed.

A first stabilizing panel may be attached to the first end cap by a first hinge at a first edge of the first end cap. The first stabilizing panel may have a distal edge. A second stabilizing panel may be attached by a second hinge at a second, opposite edge of the first end cap. The second stabilizing panel has a distal edge. The first and second stabilizing panels fasten together near the respective distal edges and, when positioned substantially parallel to the first end cap, apply an expanding force to the first end cap. A third and fourth stabilizing panel may be attached to the second end cap.

In another embodiment, a filter for a spray coating system is disclosed. The filter comprises a housing including a peripheral sidewall having an inlet opening on a first side and an outlet opening on a second, opposite side of the housing. The inlet and outlet openings provide substantially no resistance to the flow of gas along a flow path extending through the housing from the inlet opening to the outlet opening. A collapsed support backing has at least a first substantially planar panel joined at a first edge to a first edge of a second substantially planar panel. The first and second panels have openings formed therethrough to provide substantially no resistance to the flow of gas through the panels. A hinge is formed where the first edge of the first panel is joined to the first edge of the second panel, whereby the support backing may be expanded by pivoting the first panel along the hinge relative to the second panel to align the first panel at a predetermined, non-parallel angle relative to the second panel. Filtration material may be attached to the support backing. First and second pleated end caps may be mounted to the support backing at opposite ends of the first and second panels for maintaining the first and second panels at the predetermined angle when the end caps and support backing are expanded to an operable configuration within the housing. The end caps have a plurality of rigid pleat regions with preferential hinge lines at edges thereof that permit the first and second end caps to attain a substantially planar configuration when the attached support backing is expanded. This may be by pivoting the first panel along the hinge relative to the second panel to a predetermined, non-parallel angle.

Disclosed herein is a method of making a gas filter. The method comprises the step of expanding a support backing from a compressed state. The support backing has at least a first substantially planar panel joined at a first edge to a first edge of a second substantially planar panel. The first and second panels have openings formed therethrough to provide substantially no resistance to the flow of gas through the panels. A filtration material may be attached to the support backing. The first and second pleated end caps, which are mounted to the support backing at opposite ends of the first and second panels, are expanded. The end caps may have a plurality of rigid pleat regions with preferential hinge lines at edges thereof that permit the first and second end caps to attain a substantially planar configuration when the attached support backing is expanded. This expansion of the support backing may be by pivoting the first panel along the hinge relative to the second panel to a predetermined, non-parallel angle. The end caps maintain the first and second panels at the pre-determined angle when the end caps and support backing are expanded to an operable configuration. The combination of the support backing and end caps may be inserted into a housing including a peripheral sidewall having an inlet opening on a first side and an outlet opening on a second, opposite side. The inlet and outlet openings provide substantially no resistance to the flow of gas through the housing. The support backing may be inserted within the peripheral sidewall between the inlet and outlet openings.

The method may further include fastening a first stabilizing panel to a second stabilizing panel and disposing the first and second stabilizing panels substantially parallel to the first end cap, thereby applying an expanding force to the first end cap. Furthermore, the method may include fastening a third stabilizing panel to a fourth stabilizing panel and disposing the third and fourth stabilizing panels substantially parallel to the second end cap, thereby applying an expanding force to the second end cap.

Disclosed herein is a filter for a spray coating system. The filter comprises a housing including a peripheral sidewall having an inlet opening on a first side for receiving a flowing gas and an outlet opening on a second, opposite side of the housing. The inlet and outlet openings provide substantially no resistance to the flow of gas along a flow path extending through the housing from the inlet opening to the outlet opening. A support backing may be disposed within the peripheral sidewall, and the support backing may have a lateral center, an upstream side facing the inlet opening and to which a filtration material is attached, and a downstream side facing the outlet opening. The support backing may have at least a first substantially planar panel joined at a first edge to a first edge of a second substantially planar panel at a predetermined, non-parallel angle thereto. The first and second panels may have openings formed therethrough to provide substantially no resistance to the flow of gas through the panels. The first substantially planar panel has filtration media facing away from the lateral center and at least a segment of the first substantially planar panel has an upstream end that is farther from the lateral center than a downstream end.

The filter may further include first and second end caps mounted to the support backing at opposite ends of the first and second panels for maintaining said at least first and second panels at the predetermined angle. The end caps may be transverse to the first edges of the first and second panels. The end caps may have a plurality of preferential hinge lines formed thereon to permit the first and second end caps to collapse to a pleated configuration. A first stabilizing panel may be attached to the first end cap by a first hinge at a first edge of the first end cap. The first stabilizing panel may have a distal edge. A second stabilizing panel may be attached to the first end cap by a second hinge at a second, opposite edge of the first end cap. The second stabilizing panel may have a distal edge. The first and second stabilizing panels may fasten together near the respective distal edges and, when positioned substantially parallel to the first end cap, may apply an expanding force to the first end cap.

It is contemplated that the filter may have a first web pivotably mounted at a first end of at least one of the first and second panels. The first web may be attached to the other of the first and second panels transverse to the first edges of the first and second substantially planar panels. The web may be for maintaining said at least first and second substantially planar panels at the predetermined angle at the first end. Furthermore, the filter may have a second web pivotably mounted at a second end of at least one of the first and second panels. The second web may be attached to the other of the first and second panels transverse to the first edges of the first and second panels. The second web may be for maintaining the first and second substantially planar panels at the predetermined angle at the second end. The first and second webs may be on opposite sides of the flow path.

Disclosed herein is a filter for a spray coating system. The filter comprises a housing including a peripheral sidewall having an inlet opening on a first side and an outlet opening on a second, opposite side of the housing. The inlet and outlet openings provide substantially no resistance to the flow of gas along a flow path extending through the housing from the inlet opening to the outlet opening. A support backing is disposed within the peripheral sidewall between the inlet and outlet openings. The support backing has at least a first substantially planar panel joined at a first edge to a first edge of a second substantially planar panel at a predetermined, non-parallel angle thereto. The first and second panels may have openings formed therethrough to provide substantially no resistance to the flow of gas through the panels. A hinge may be formed where the first edge of the first panel is joined to the first edge of the second panel. The support backing may be collapsed by pivoting the first panel along the hinge relative to the second panel. A filtration material may be attached to the support backing. A first web may be pivotably mounted at a first end of at least one of the first and second panels. The first web may be attached to the other of the first and second panels transverse to the first edges of the first and second panels for maintaining said at least first and second substantially planar panels at the predetermined angle at the first end. Furthermore, a second web may be pivotably mounted at a second end of at least one of the first and second panels. The second web may be attached to the other of the first and second panels transverse to the first edges of the first and second substantially planar panels. The second web may be for maintaining the first and second substantially planar panels at the predetermined angle at the second end. The first and second webs may be on opposite sides of the flow path. The first and second webs may have a plurality of preferential hinge lines formed thereon to permit the first and second webs to collapse into a pleated shape when the attached support backing is collapsed.

Disclosed herein is a method of making a gas filter. The method comprises the steps including expanding a support backing from a compressed state. The support backing may have at least a first substantially planar panel joined at a first edge to a first edge of a second substantially planar panel. The first and second panels may have openings formed therethrough to provide substantially no resistance to the flow of gas through the panels and a filtration material attached to the support backing. The method may include the step of expanding a housing from a compressed state. The housing includes a peripheral sidewall having an inlet opening on a first side and an outlet opening on a second, opposite side of the housing. The inlet and outlet openings provide substantially no resistance to the flow of gas through the housing. The method may include the step of inserting the support backing into the housing within the peripheral sidewall between the inlet and outlet openings. The method may include attaching a first web, which is pivotably mounted at a first end of at least one of the first and second panels, to the other of the first and second panels transverse to the first edges of the first and second panels. The first web may be for maintaining the first and second substantially planar panels at the predetermined angle at the first end. The method may include attaching a second web, which is pivotably mounted at a second end of at least one of the first and second panels, to the other of the first and second panels transverse to the first edges of the first and second substantially planar panels. The second web may be for maintaining the first and second substantially planar panels at the predetermined angle at the second end. The invention described and shown herein creates an extended surface area filter structure that preferably fits in a conventional modular wall frame that is known for use in industrial coating applications. The wall frame can be a metal frame that is used with paint booth filter apparatuses, or a similar structure to hold filters using various structural features. This product is structurally different from the prior art and lower in cost.

The invention is preferably sold in a flat, collapsed, and/or unassembled state to be assembled into a final form after being shipped, preferably without significant skill requirements or adhesives, other than tape. Preferably the filter allows the use of various filter media types without changing the basic supporting structure, thereby providing an extremely useful, highly variable filter structure.

Figure 1:
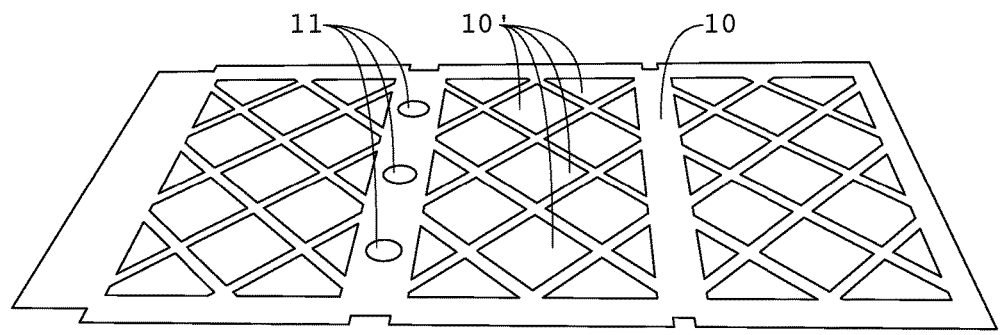
FIG. 1 is a view in perspective illustrating a preferred support backing.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

U.S. Provisional Application No. 61/808,946 filed Apr. 5, 2013, and U.S. Non-Provisional application No. 14/246,669, filed Apr. 7, 2014, now U.S. Pat. No. 9,555,358, are incorporated in this application by reference.

A support backing 10 is shown in FIG. 1, and is preferably made of rigid corrugated paperboard sheet with an initially planar configuration. The support backing 10 can be made of any suitable materials including, but not limited to, paper, wood, metal, plastic, or composite. Openings 10' are formed through the support backing 10 so that air can flow therethrough without substantial resistance. The openings 10' can have a rectangular shape that is about two inches by two inches. Of course the openings can be formed of different shapes, and they can be larger or smaller that those shown and described as long as the openings provide substantially no resistance to the flow of air through them. Substantially no resistance to the flow of air is defined herein as pressure drop quantities that do not normally register as measurable using standardized pressure drop test air volumes.

Figure 6:
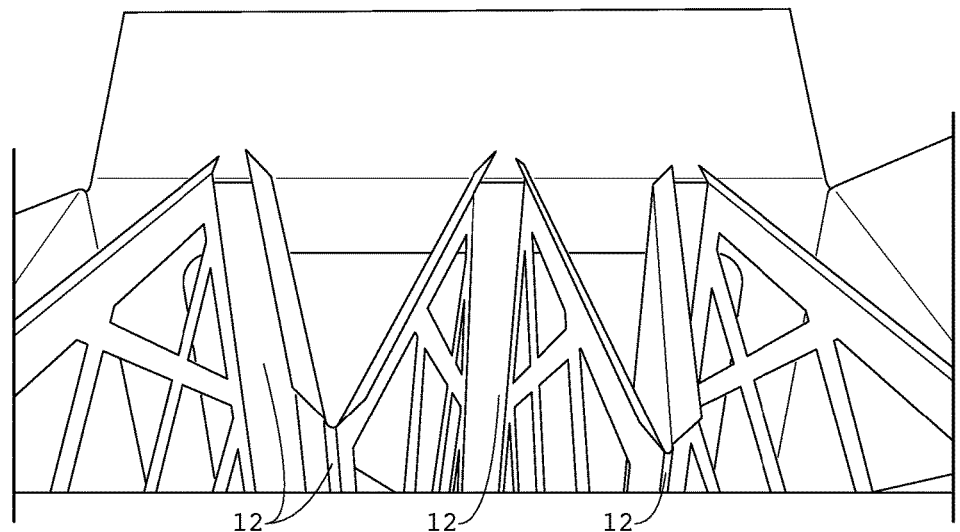
FIG. 6 is a view in perspective illustrating the opening of the housing of FIG. 4 with the support backing of FIG. 3 with no end cap.
Figure 7:
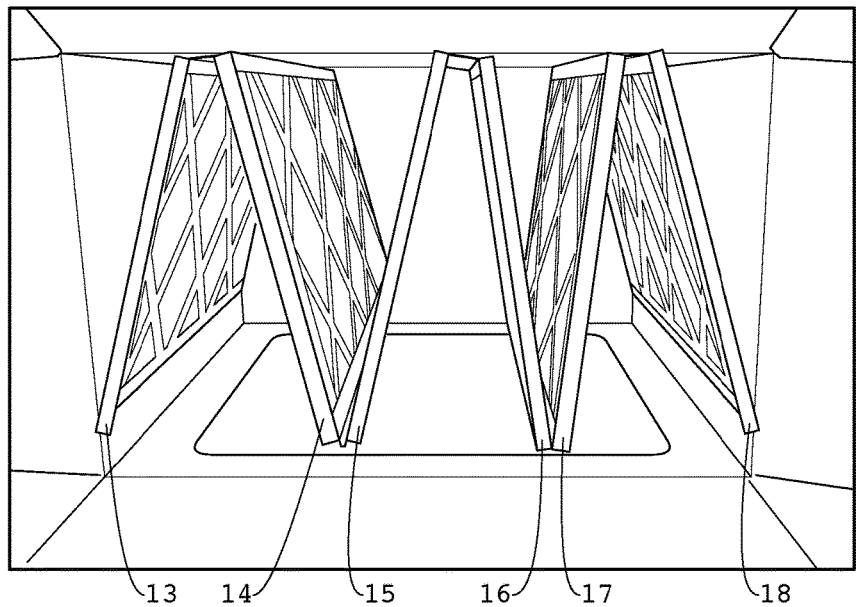
FIG. 7 is a top view illustrating a housing with a support backing mounted therein.

The preferably planar sheet of the support backing 10 is bent along hinges 12 (see FIG. 6) to form a pleated configuration. The hinges 12 are preferably formed by perforating or otherwise weakening the material along straight lines, and bending the support backing 10 to fold along the lines to form hinges 12. Other means of preferentially weakening the materials are contemplated. In the pleated configuration (see FIG. 7), the support backing 10 is combined with, and preferably attached to a second or third similar sheet to that shown in FIG. 1, to define a series of panels 13, 14, 15, 16, 17 and 18, and each of the panels adjoins with and is angled to a next adjacent panel, thereby forming a plurality of generally V-shaped angled panels.

Prior to bending the support into the pleated configuration discussed above, it is preferred that filter media 20 (see FIGS. 14 and 15) be attached onto the support backing 10. In a preferred embodiment, the filter media 20 is slit and expanded paper, and is more preferably multiple layers of slit and expanded paper disposed in a stacked configuration, which can be attached to one another by adhesive, stitching or other fasteners. Filter media 20 is not shown in FIGS. 1-13 attached to the support backing 10, although there would typically be filter media 20 mounted to the support backing 10 when it is in the configuration shown, because omitting the filter media 20 allows the best illustration of the support backing 10 before and after installing in the housing (as described below).

Figure 2:
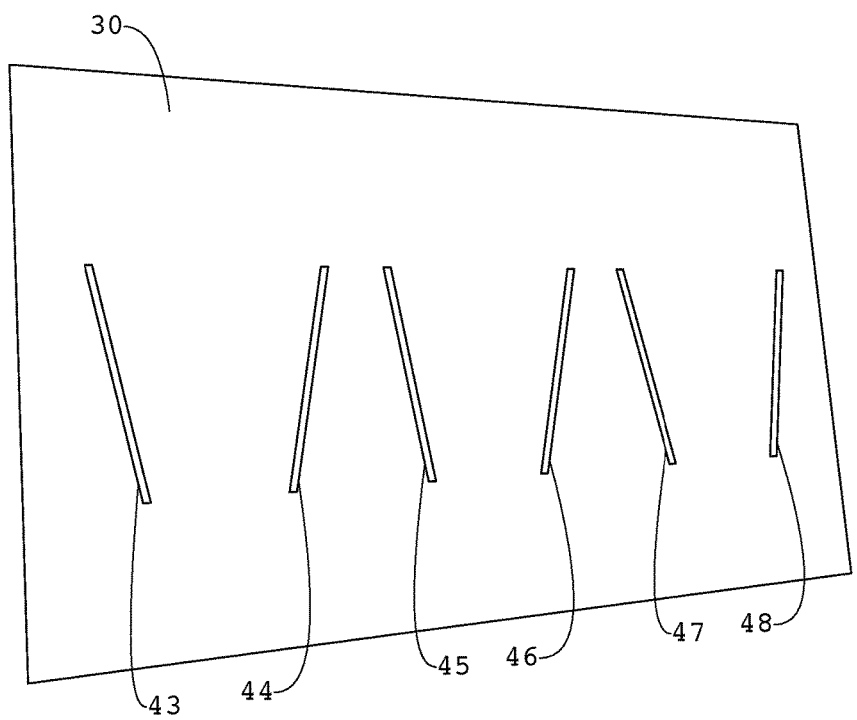
FIG. 2 is a top view illustrating a preferred end cap.
Figure 3:
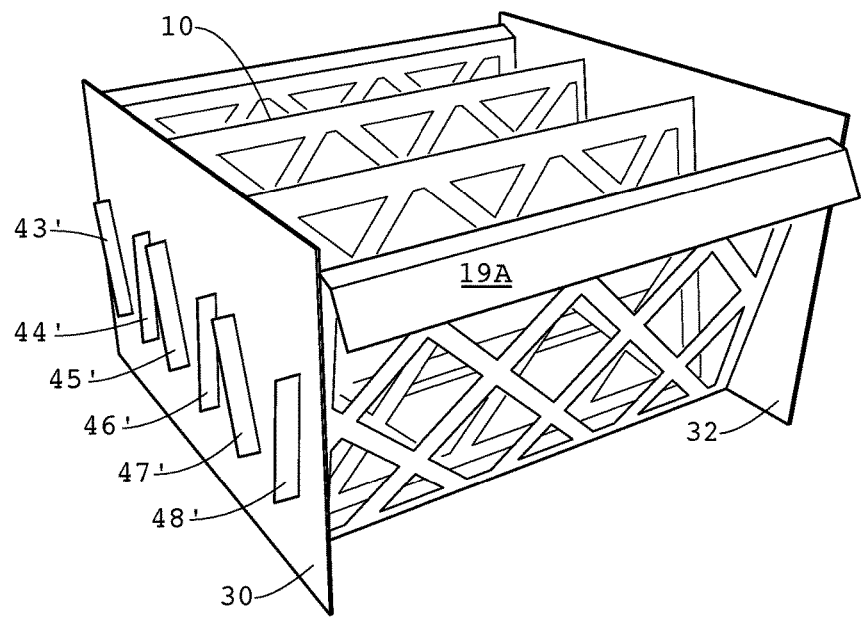
FIG. 3 is a view in perspective illustrating a preferred support backing mounted to preferred end caps.
Figure 4:
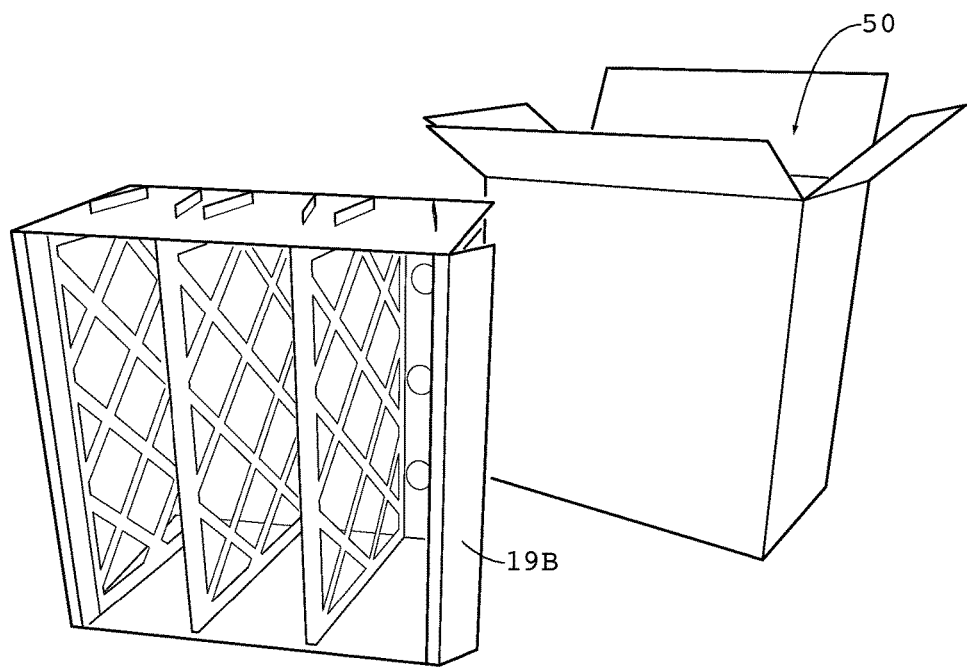
FIG. 4 is a view in perspective illustrating the support backing of FIG. 3 and a preferred housing.
Figure 5:
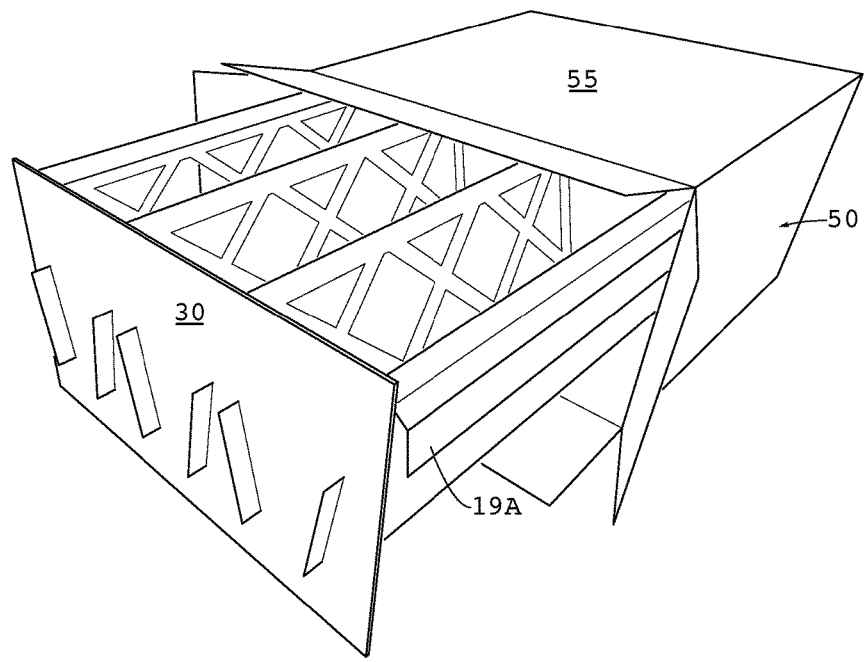
FIG. 5 is a view in perspective illustrating the support backing of FIG. 4 inserted into the housing of FIG. 4.
Figure 25:
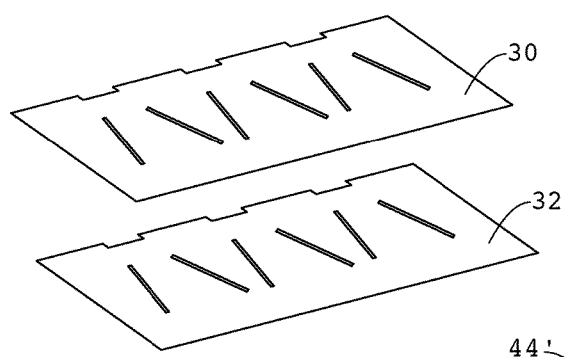
FIG. 25 is a view in perspective of the preferred end caps.
Figure 26:
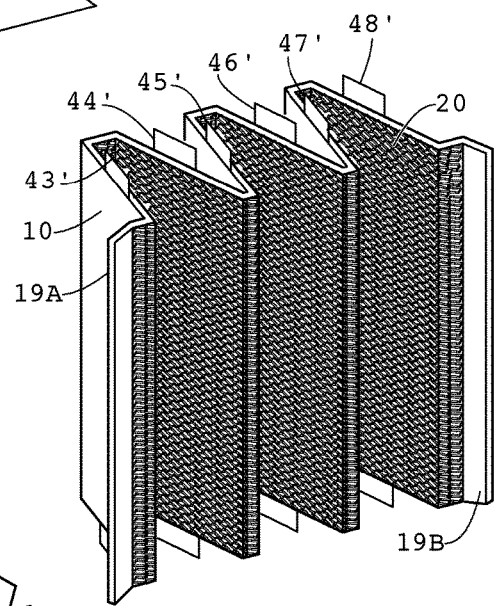
FIG. 26 is a view in perspective illustrating of the preferred support backing with attached filtration media.

The support backing 10 is bent into a pleated shape as shown in FIGS. 3-7 and 26, and is retained in that configuration by a pair of substantially planar mirror image top and bottom end caps 30 and 32, respectively, shown in detail in FIGS. 2 and 25. Slots 43, 44, 45, 46, 47 and 48 are formed through the end cap 30 at the same angles to which the panels of the support backing 10 are bent in the final configuration when looking at the end of the support backing 10 along the axis of each panel 13-18 (see FIG. 7). The slots 43-48 are aligned to be parallel to the ends of the pleated panels, as shown in FIGS. 3-5 and 26, when the panels are in the pleated orientation. Each of the slots in the end cap 30 accepts a corresponding one of the tongue-like tabs 43', 44', 45', 46', 47' and 48' extending from one end of the support backing 10, and each of the slots in the end cap 32 receives a corresponding one of the tongue-like tabs (see FIG. 26) extending from the opposite end of the support backing 20. The tabs extend through the respective slots to retain the support backing 10 in the pleated configuration. The end caps 30 and 32 hold the tabs, and therefore the support panels, at the angled relationships desired as shown in FIGS. 3, 4 and 26. Other means for holding the end caps to the support backing are contemplated.

Figure 27:
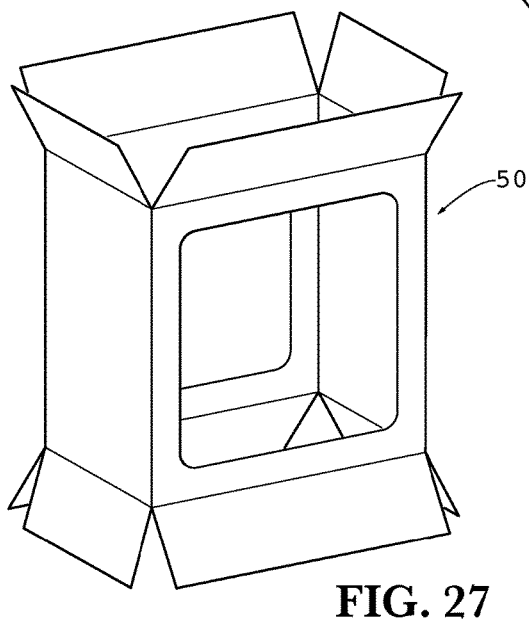
FIG. 27 is a view in perspective illustrating the preferred housing showing end flaps on opposing ends thereof.

The assembly is next installed in a housing 50, which is preferably a paperboard box, as shown in FIGS. 4 and 27. The housing 50 is preferably made of corrugated paperboard, but can be made of any suitable material including, but not limited to, paper, wood, metal, fabric, plastic, and a composite. The housing 50 is contemplated to be about 20 inches wide by about 20 inches tall by about 12 inches deep, which is a size that will fit in a conventional opening in a typical paint filtering frame, thereby permitting the filter to be installed, used, and then removed from the frame for disposal after its useful life has been reached. Of course, as will become apparent from the description herein, the size of the housing 50 is not critical, and can be varied substantially from the measurements given above as examples. For instance, the housing 50 can be more than 12 inches deep, such as 19.5 inches deep, or it can be even deeper, and it will become apparent that the housing 50 will be advantageously sized to fit the prospective paint filtering system frame opening. The housing 50 preferably has perforated, scored or other partial cuts formed through the box's opposing front and rear major faces 52 and 54 that can form openings through which air passes during use once the panels 53 and 55, which are defined by the portion of material within such cuts, are removed as shown partially in FIG. 11 and completely in FIG. 12.

Figure 46:
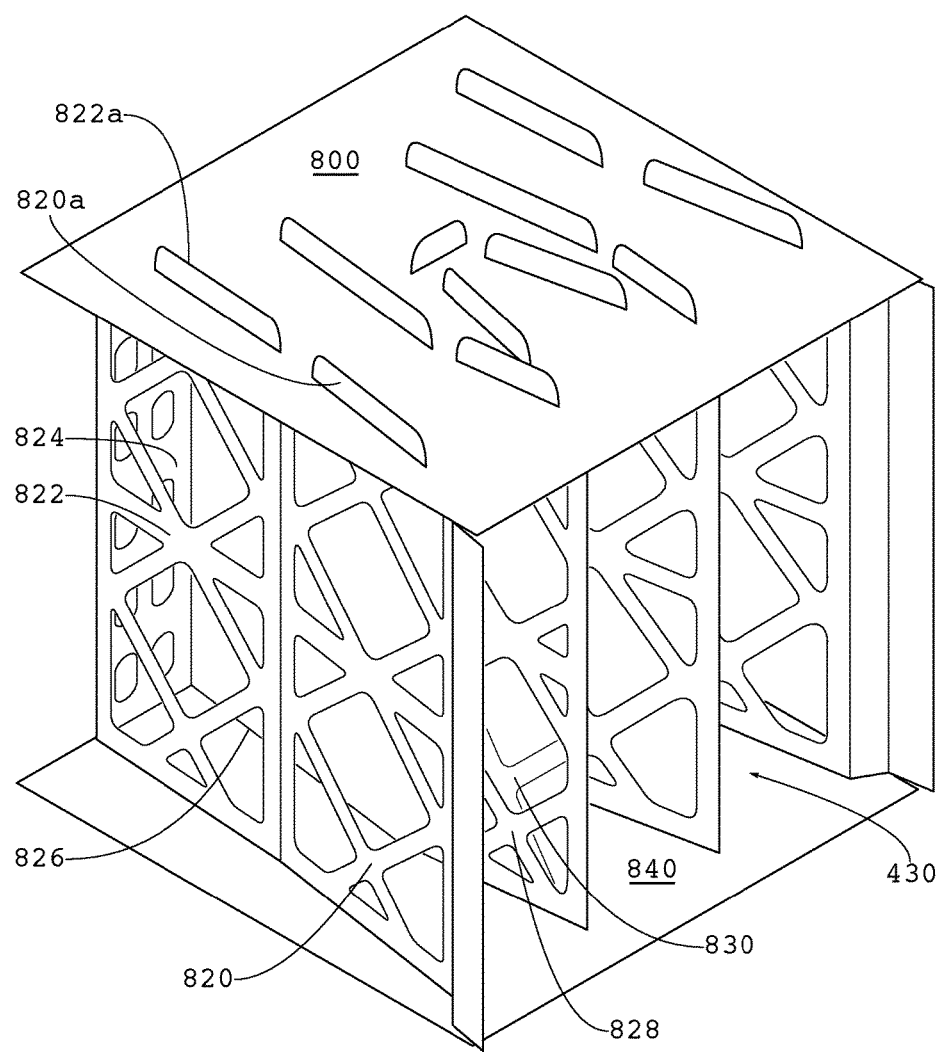
FIG. 46 is a view in perspective illustrating an alternative combination of two end caps and a support backing.
Figure 47:
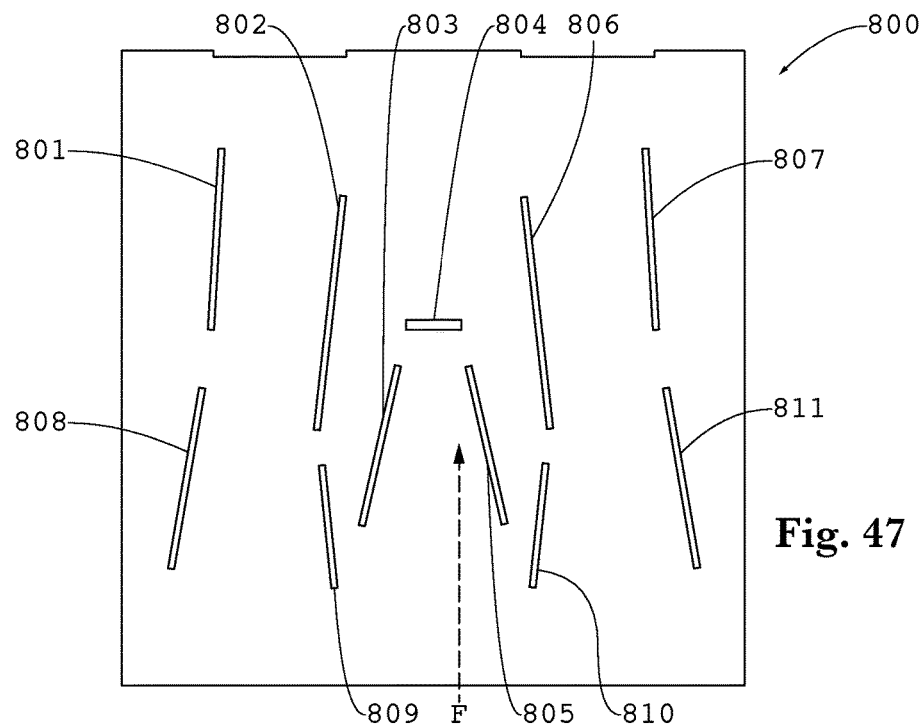
FIG. 47 is a top view illustrating an end cap of FIG. 46.
Figure 48:
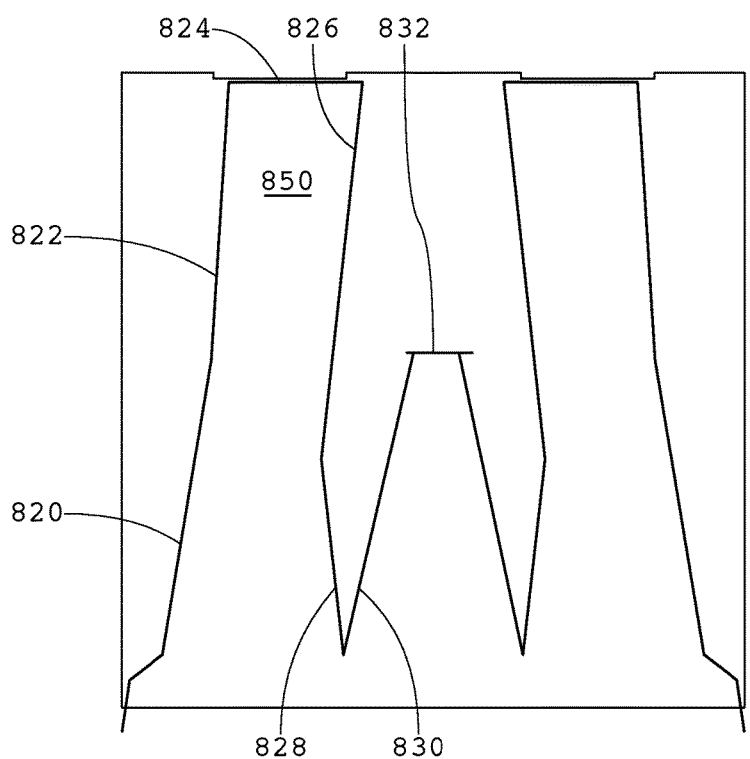
FIG. 48 is a schematic view illustrating one half of the panels of the embodiment of FIG. 46.

The embodiments shown and described are examples of optimal configurations of several geometries, but are not to be taken as the only geometries possible. In some cases certain dimensional constraints may necessitate geometric changes to the structures described herein. With certain filtration media thicknesses, the media can interfere at the intersections of the panels 13, 14, the panels 15, 16 and the panels 17, 18 shown in FIG. 7. There are several ways to prevent this such as increasing the width of the hinge 12 (FIG. 14); changing the lengths of the panels 13, 14, 15, 16, 17 or 18; and changing the geometry. FIGS. 46 and FIG. 48 show a more optimal arrangement with a larger depth. Different dimensional constraints will produce different optimal geometries s will be understood by the person having ordinary skill from the disclosure herein.

Figure 28:
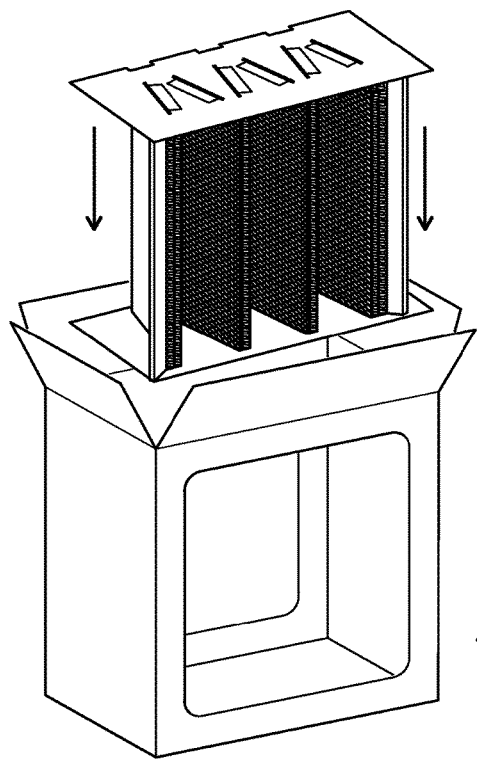
FIG. 28 is a view in perspective illustrating the combination support backing and filtration media being inserted into the housing.

The installation of the combination of the filter media 20 and the attached support backing 10 into the housing 50 is carried out by sliding the combination into the housing 50 with the bottom cap 32 parallel to and ultimately adjacent the bottom end wall of the housing 50 and the top cap 30 parallel to the final (closed) position of the top end wall of the housing 50, as shown in FIG. 28. There are preferably flaps 56, 57, 58 and 59 on the top of the housing 50 that form the top end wall (and similar flaps on the bottom of the housing that form the bottom end wall). The flaps 56-59 are similar to conventional flaps for corrugated paperboard boxes, and these may be manually or automatically closed in a similar manner, such as by hand or machine.

Figure 8:
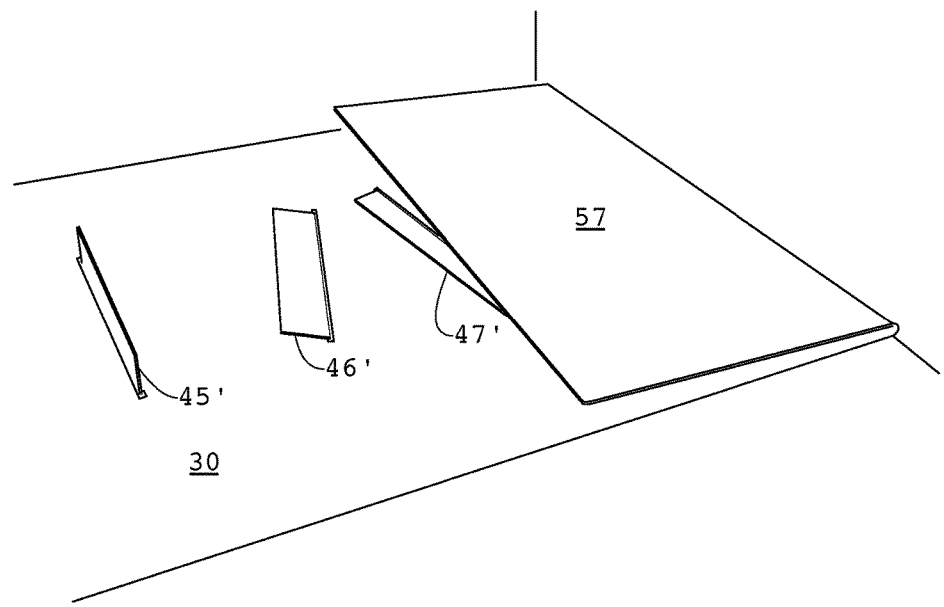
FIG. 8 is a view in perspective illustrating the housing with the end cap and tabs bent after folding of the housing flaps.
Figure 9:
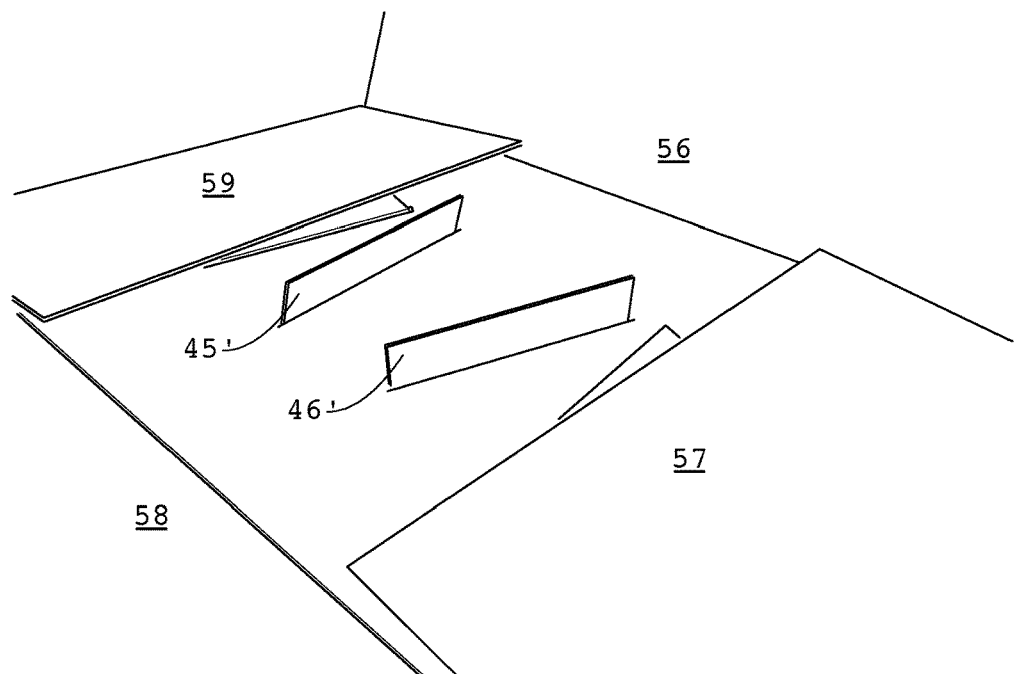
FIG. 9 is a view in perspective illustrating the housing with tabs bent after folding of the housing flaps.
Figure 10:
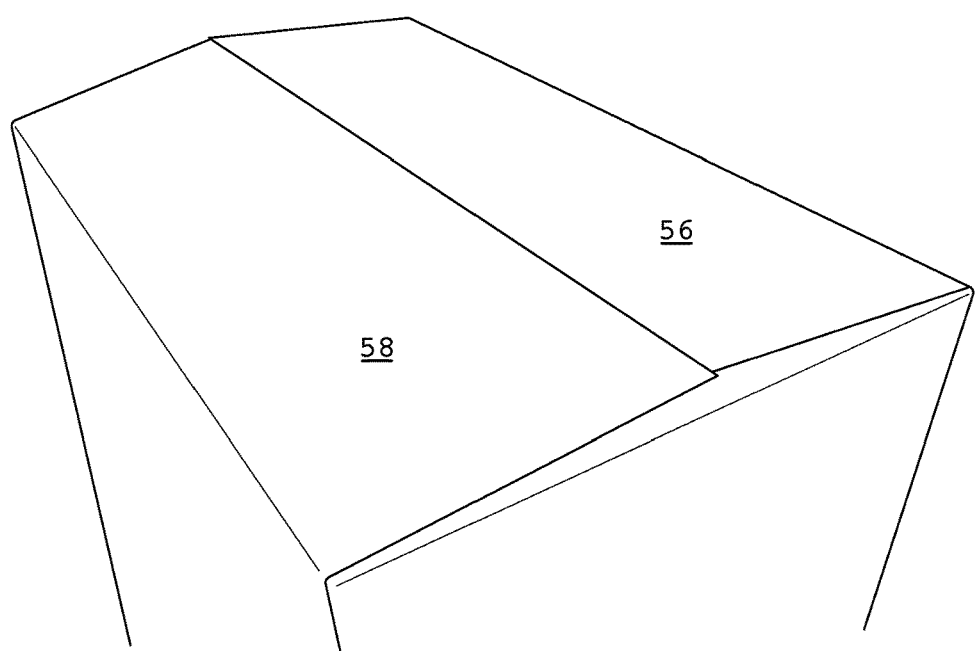
FIG. 10 is a view in perspective illustrating the housing with flaps folded.
Figure 29:
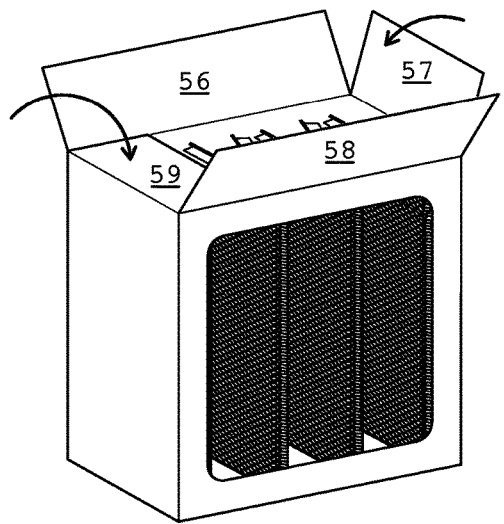
FIG. 29 is a view in perspective illustrating the top flaps being folded over after the step illustrated in FIG. 28.
Figure 30:
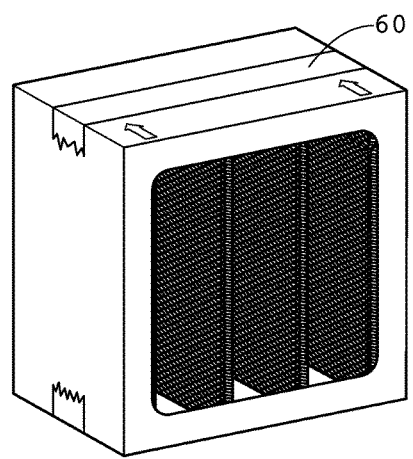
FIG. 30 is a view in perspective illustrating the taping of the flaps of the housing shown in FIG. 27.

As shown in FIGS. 8, 9 and 29, the flaps 56-59 preferably cause the tabs extending through the slots in the end caps 30 and 32 to bend over to be parallel to the end caps 30 and 32, thereby forming an angle of about ninety degrees with the corresponding panels of the support backing 10 from which the tabs extend. Thus, when the housing flap 57 is fastened over the bent tab 47' as the flap 57 is folded to an orientation parallel to the end caps 30 and 32, and then the remaining flaps are folded over, it is essentially impossible for the tabs to be pulled out of the top and bottom caps 30 and 32 during normal use without tearing the tabs. Furthermore, the flaps 56-59 are preferably attached in the closed position shown in FIG. 10 by a suitable fastener, such as tape 60 (see FIGS. 16 and 30), adhesive or other fastener. It should be noted that the end caps 30 and 32 can be omitted if the support backing 10 is attached, such as by using adhesives or double-sided tape, to the flaps of the housing 50, or end caps are integrated with the support backing 10, as described in more detail below.

As noted above, the filter media 20 is attached to the support, as shown in FIGS. 26 and 28-30, but is not shown this way in other illustrations in order for the apparatus to be more readily seen. Multiple layers of slit and expanded paper are currently used as a filter media 20 for paint filtering products, and all such slit and expanded paper media is contemplated. The layers of filter paper can differ from the upstream to the downstream of the filter, such as by the sizes of the holes in the paper, the solid material between the holes, the shapes of the holes and/or the positions of the holes relative to the solid portions. This can thereby allow one to create a filter of ever decreasing hole size, offset holes, etc. to maximize paint retention and depth loading for high holding capacity. In one contemplated embodiment, a layer of slit and expanded paper placed in the most upstream position has the largest holes, the next downstream layer has smaller holes, and so forth to the downstream side of the housing where air exits at the downstream end through the smallest holes.

It is contemplated to add a polymer filter media layer as a layer that air passes through last when traversing the filter media 20 during normal operation in order to most effectively remove any matter that is desirably removed from the air. Indeed, one of the many advantages of the invention is that, due to the manner by which filtration media is mounted to the support backing, not only can virtually any filtration media known be used, but significant variations in the types of filtration media will not cause substantial variations in the operation of the filter that would require modifications to the rest of the filter. Thus, from one filter to another, the filtration media can be modified based on the use, and the only modification required to the filter is the filtration media. Neither the support backing, nor the housing, nor the end caps need to be modified based on a change in the filtration media. This provides significant flexibility in use.

Figure 13:
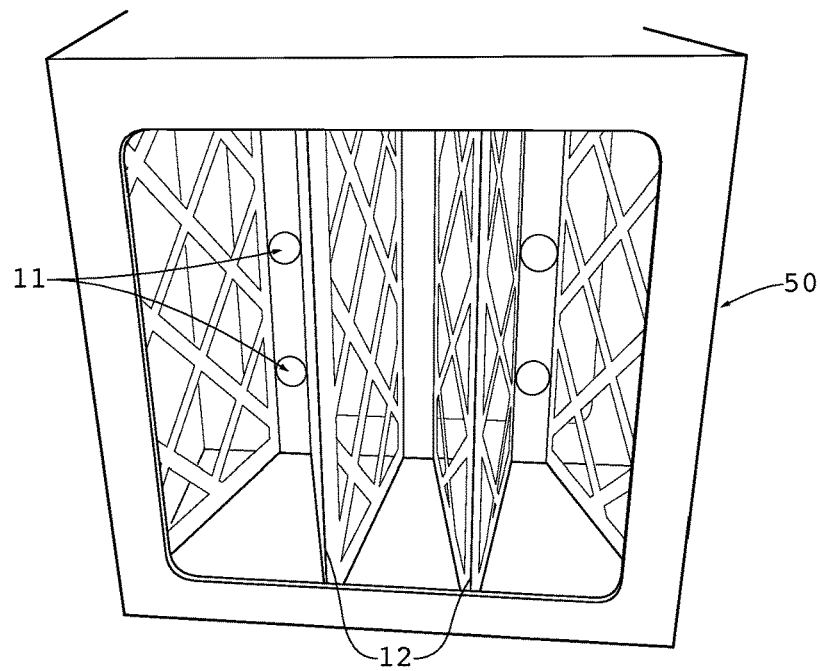
FIG. 13 is an inlet side view illustrating the present invention with both portions removed to open the housing's inlet and outlet sides.
Figure 14:
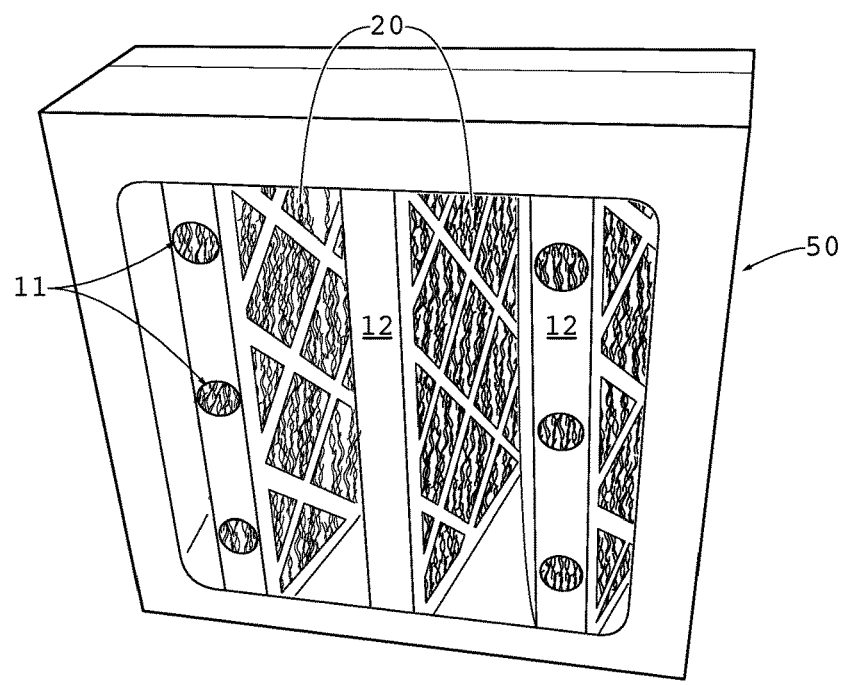
FIG. 14 is a view in perspective illustrating the present invention in operable configuration.

As shown in FIG. 13 (showing the air or other gas inlet side) and FIG. 14 (showing the air or other gas exit or outlet side), the hinges 12 at the exit side of the housing 50 are preferably wider than the hinges 12 on the inlet side where a sharper, typically V-shaped bend is formed. The wider exit hinges 12 thereby have a larger space between the furthest extremes of next adjacent panels so that the filter media 20 can be tucked into the wide exit hinges 12. Because the exit hinges 12 in the support backing 10 are wider, there is room for the thicker (preferably about one-half inch thick) filter media 20, which is bent at the hinge, to fit therein. This prevents either severe compression of the media or shortening of the depth of the panels that would occur with single bends forming a V-shaped hinge. Apertures 11 are also formed in at least some of the wider exit hinges 12 to permit air to flow without substantial resistance through the backing support 10 in these regions. As shown in FIG. 14, large apertures 11 can be formed in the wide exit hinges 12 between adjacent panels in order to allow airflow through the exit hinges 12. The filter media 20 covers these apertures on the upstream side, as shown in the view of FIG. 14, and receives paint during ordinary use.

Figure 11:
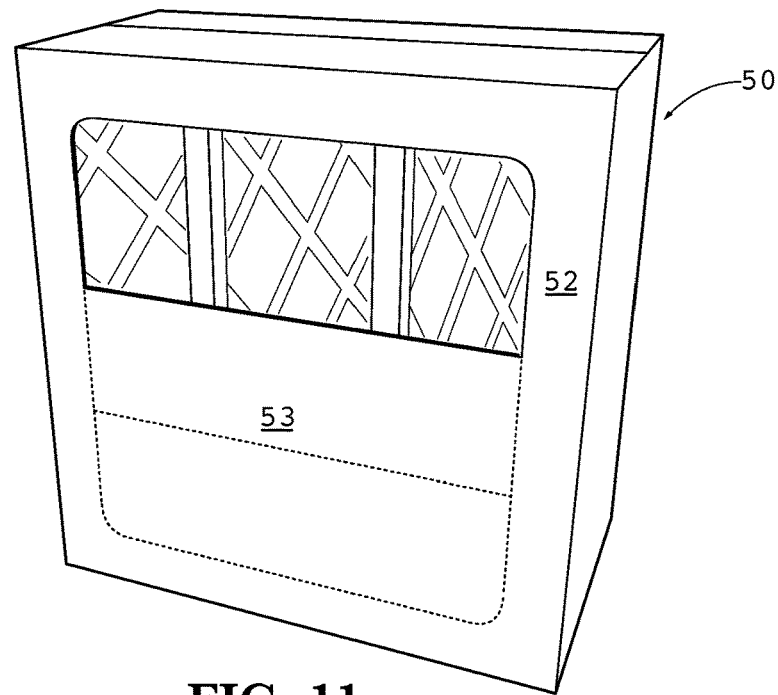
FIG. 11 is a view in perspective illustrating the preferred embodiment with one of the portions partially removed from the housing.
Figure 12:
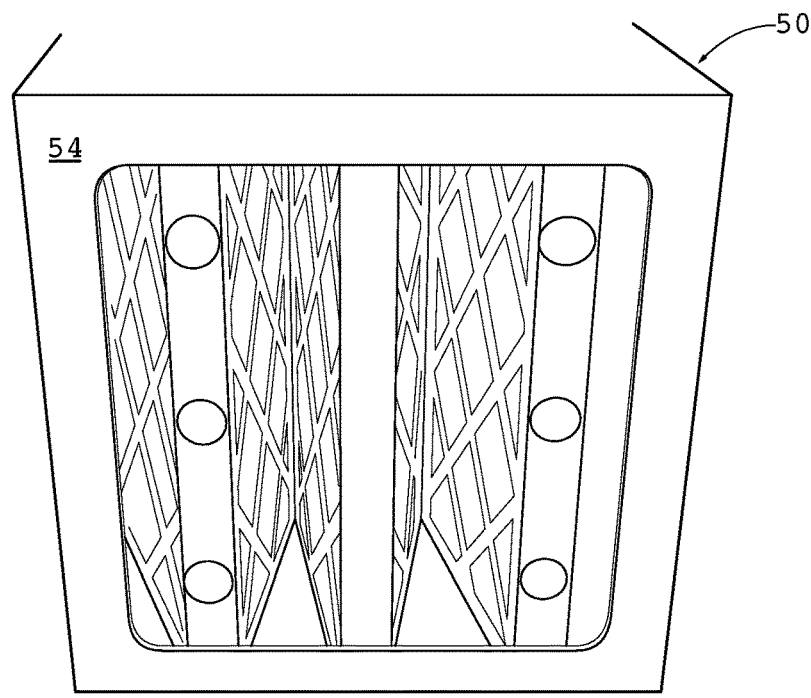
FIG. 12 is an outlet side view illustrating the present invention with both portions removed to open the housing's inlet and outlet sides. The support backing is shown with the filtration media removed for illustrative purposes.

As shown in FIG. 11 with the paperboard portion 53 partially removed, the openings are partially formed in the major faces of the housing 50 to expose the internal assembly to a flow of air therethrough. The FIG. 14 structure, with all paperboard portions removed, can be placed in a filter frame of a spray-coating system so that air or other gas that contains paint particles and other material can be forced through the filter. The paint and other particles impact the filter media 20 and adhere to the filter media 20 rather than passing through the filter. In a preferred embodiment, the paperboard portions that are removed to form openings can remain in place until just before use so that the entire product can be shipped without having to be packaged in a separate container. That is, the outer box housing 50 serves as a "shipping container" for the product. Upon arrival at the end user's location, the portions within the perforated lines are removed by hand to form the openings, and the product is put into use.

In a contemplated embodiment, the support backing 10 with filtration media 20 attached thereto is in a collapsed configuration, such as by being compressed from both ends, when apart from the end caps 30 and 32, as shown in FIG. 26. The FIG. 26 structure is thus compressed from each end so the sidewalls are substantially parallel to one another in a collapsed configuration, which may be used during shipping and/or storage. The collapsed configuration reduces the volume such a structure occupies. Furthermore, the housing 50 may also be collapsed, such as by being compressed into a substantially flat state (not shown), by folding the flaps open and collapsing along two opposite corners. Further folding can be carried out as well. Finally, the end caps are placed substantially parallel to the collapsed housing 50 and the collapsed support backing 10, thereby occupying a small volume, and also packaged, such as in transparent polymer film, a paper bag, a thin box, or the like. In this configuration the embodiment can be shipped without occupying as much volume as when it is in its useable (operable) configuration. Thus, the recipient of the package can remove the components and assemble the filter by expanding the housing and support backing 10, inserting the tabs in the respective slots of the end caps 30 and 32, installing the assembly in the housing, and then taping the flaps shut.

As can be seen in FIGS. 3-5 and 26, there are wings 19a and 19b formed at opposite extreme ends of the pleated panels. Filter media 20 extends over the wings 19a and 19b, and thread is stitched through the wings 19a and 19b to hold the filter media 20 to the backing support 10. The wings 19a and 19b seat against the opposing inner surfaces of the housing when the assembly is installed therein, and form a seal against the inner surfaces. It is preferred that no adhesive or other fastener that is used to attach the filter media 20 to the wings 19a and 19b to the internal surfaces of the housing. Instead, the wings 19a and 19b are configured so that the force due to the flow of the air through the housing 50 tends to seat the wings strongly against the internal surfaces of the housing to prevent air bypassing the filter media 20. When high velocity air is blown through the openings of the housing 50, the wings 19*a* and 19*b* are forced, by virtue of the air's direction and the angled surface of the adjacent panel, against the inwardly facing surface of the adjacent side of the housing 50. This causes the filter media 20 to be compressed between each wing and adjacent sidewall of the housing 50, thereby preventing any air bypass that might escape a tortuous path through the filter media 20.

Figure 15:
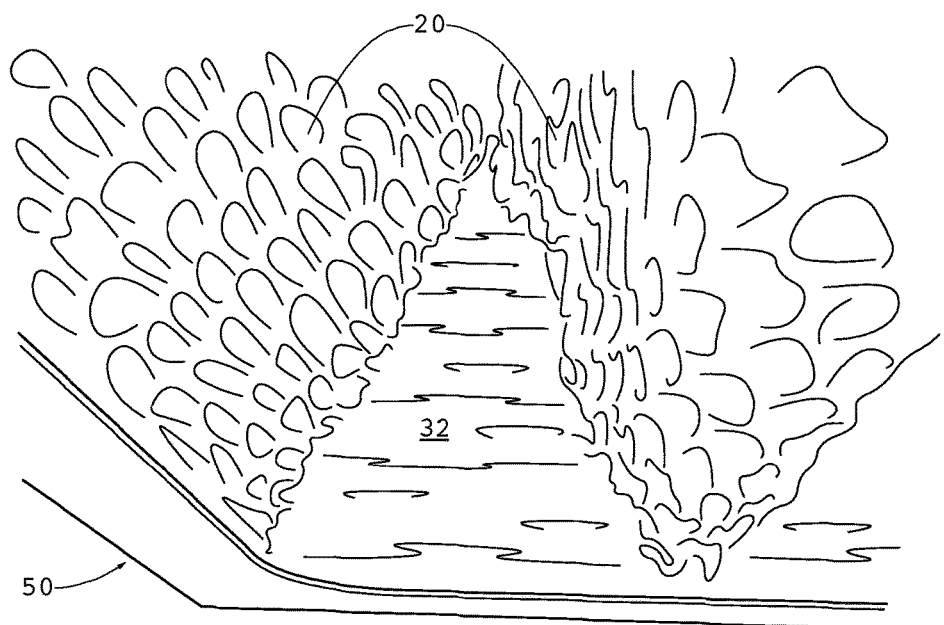
FIG. 15 is a magnified view in perspective illustrating the present invention after use.
Figure 16:
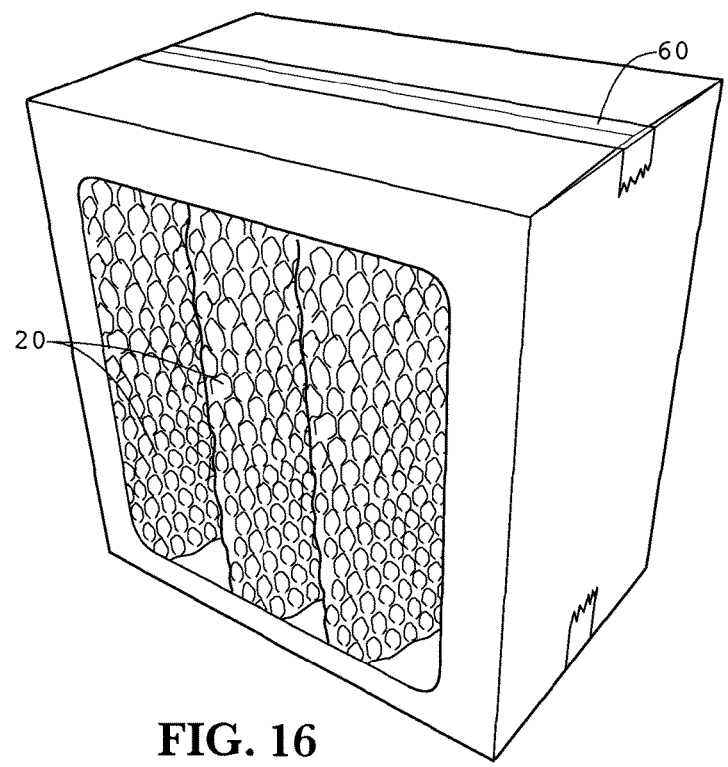
FIG. 16 is a view in perspective illustrating the present invention after use.
Figure 17:
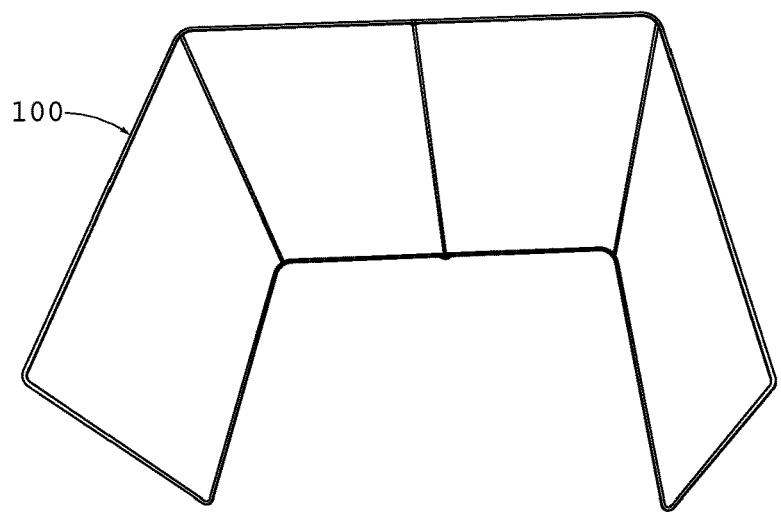
FIG. 17 is a view in perspective illustrating a rigid frame of an alternative embodiment.
Figure 18:
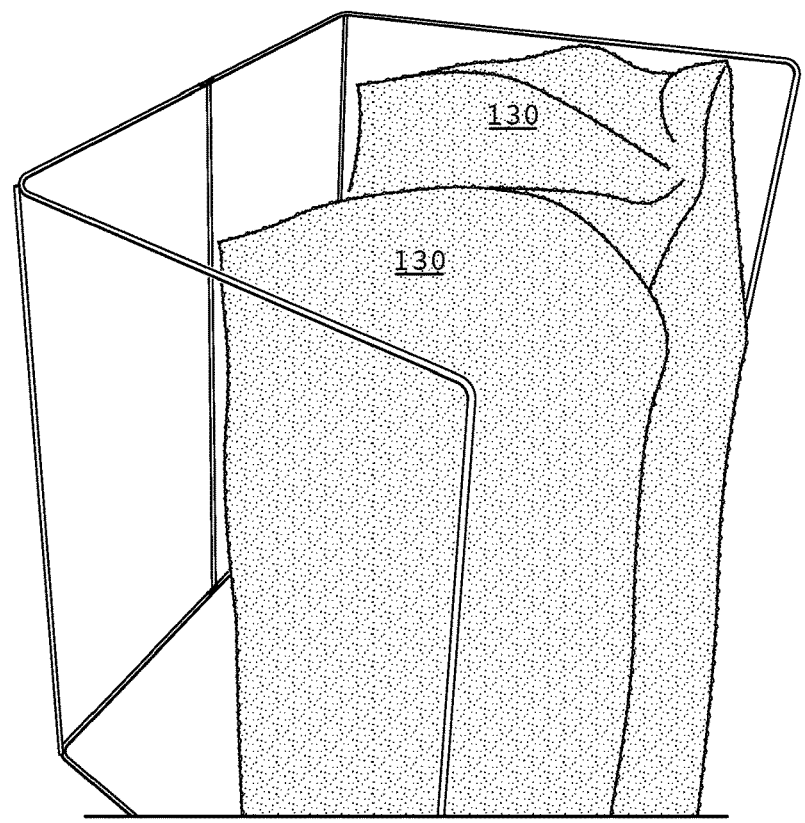
FIG. 18 is a view in perspective illustrating the rigid frame of FIG. 17 with a conventional bag filter arrangement.
Figure 19:
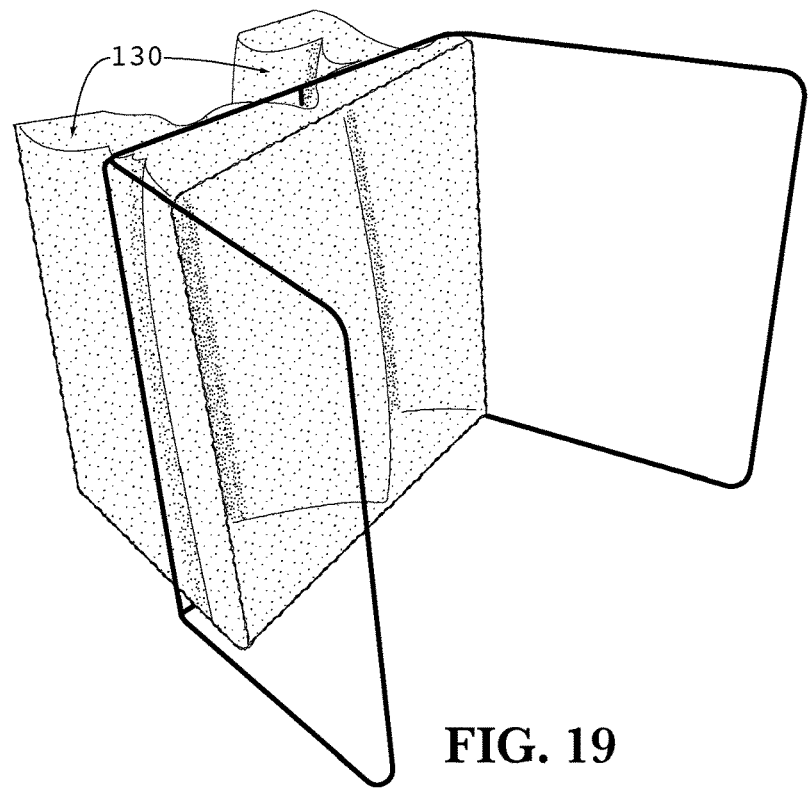
FIG. 19 is a view in perspective illustrating the frame and bag filter in an operable orientation.
Figure 20:
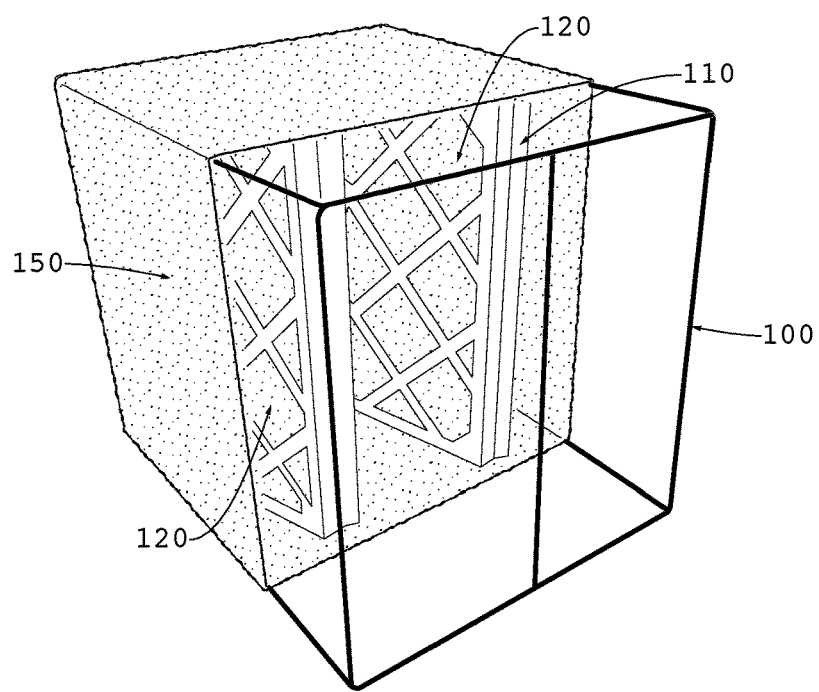
FIG. 20 is a view in perspective illustrating a housing with support backing and filtration media disposed therein and the frame inserted partially between the housing and the support backing.
Figure 21:
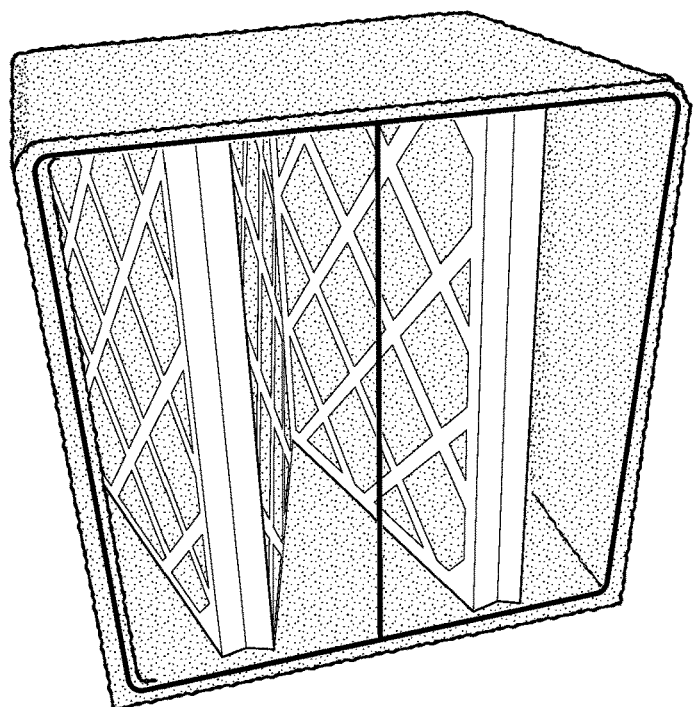
FIG. 21 is a view in perspective illustrating the outlet side of the embodiment of FIG. 20.
Figure 22:
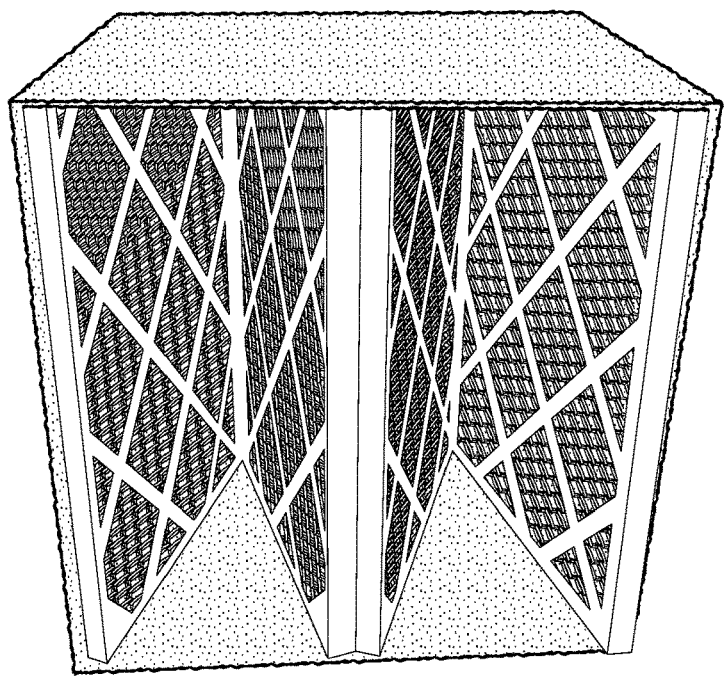
FIG. 22 is a view in perspective illustrating the inlet side of the embodiment of FIG. 20.

As shown in FIGS. 15 and 16, paint collects on the inlet side of the media and can run down to the bottom of the housing 50. The end caps 30 and 32 provide extra absorption of paint at the ends to prevent paint from running out of the filter. As can be seen from the rear view of the filter in FIG. 14, the paint (red in this example), loads the media and does not pass entirely through the filter. Instead, when the filter is sufficiently loaded with matter, it is discarded.

It should be noted that, although the preferred embodiment of the invention has a paperboard support backing, housing and paper filtration media, it is possible to use synthetic filtration media with an otherwise paperboard housing and support backing. It is also contemplated that any conventional material can be used to form the housing and support backing. For example, fiberglass is a known support backing and, in different composition, as a filtration media. Polyester is also a known filtration media, as are needle felt and others. The housing may be made of wood, paper, plastic or a fiber-reinforced composite. The person of ordinary skill will understand how to incorporate these materials into the invention from the description herein.

An alternative embodiment is contemplated having a substantially synthetic housing and support backing, as shown in FIGS. 17-25. A rigid, preferably metal, frame 100 (FIG. 17) is shown with a synthetic, non-woven fiber covering the frame and forming a housing 150. The frame 100 is preferably collapsible or is assembled from a compact state. The housing 150 can be any material, including without limitation felt, fabric, and TYVEK brand polytetrafluoroethylene film, and is also collapsible. The paint collecting filtration support backing 110 and filtration media 120 can be synthetic or paper, as with the embodiment of FIGS. 1-16, and preferably folds or otherwise collapses to a compact state. One or more conventional bag filters 130, which are also collapsible, can be added to the outlet side, but are not required. The filtration media 120 can be attached to the support backing 110 by stitching in a conventional manner around the peripheral edges of the media and the support backing 110 prior to the backing support 110 being formed in the pleated configuration. Alternatively, the media can be attached otherwise, such as by gluing or sonic welding, among other means of attachment. Because the media is attached to the support backing 110, virtually any media can be used, and enormous variation is permitted by the invention as to the types of media used.

Figure 23:
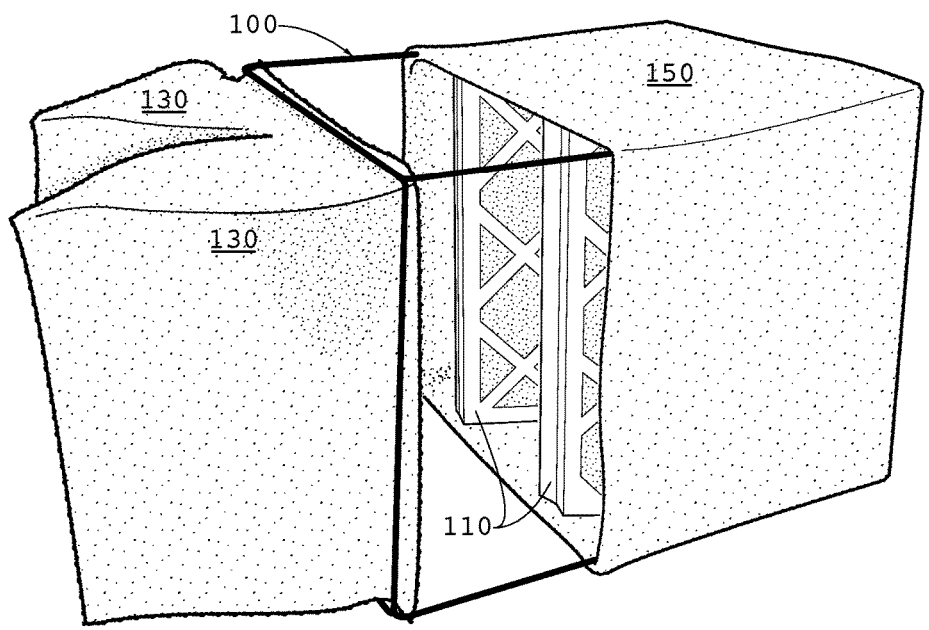
FIG. 23 is a view in perspective illustrating the embodiment of FIG. 20 in a nearly completed stage.
Figure 24:
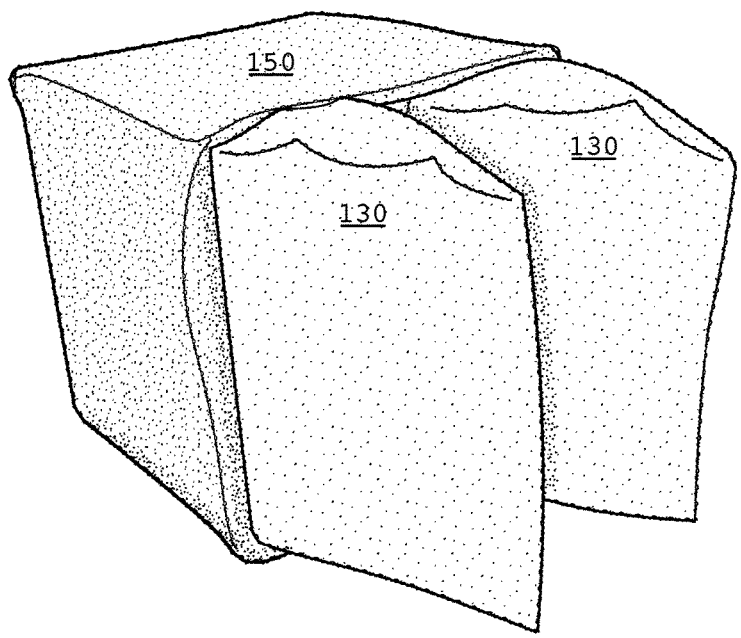
FIG. 24 is a view in perspective illustrating the embodiment of FIGS. 17-23 in a completed stage.

As shown in FIGS. 17-25, the metal frame 100 supports the housing 150, and the bag filters 130, and at least a portion of the frame 100 is inserted between the housing 150 and the support backing 110. Preferably, the bag filters 130 are placed in the metal frame 100 prior to inserting the legs of the metal frame 100 into the housing 150 that contains the support backing 110 and filtration media 120, as shown in FIG. 23. FIG. 24 shows the completed filter from the rear, where the bag filters 130 are positioned over the rear (exit) side of the filter. The FIG. 24 embodiment is advantageous due to various features, including without limitation the lower cost of the components thereof, the fact that it is collapsible to a significant degree, and the smaller volume for disposal, shipping and/or recycling. Furthermore, the metal frame 100 can be reused, or easily recycled.

Figure 31:
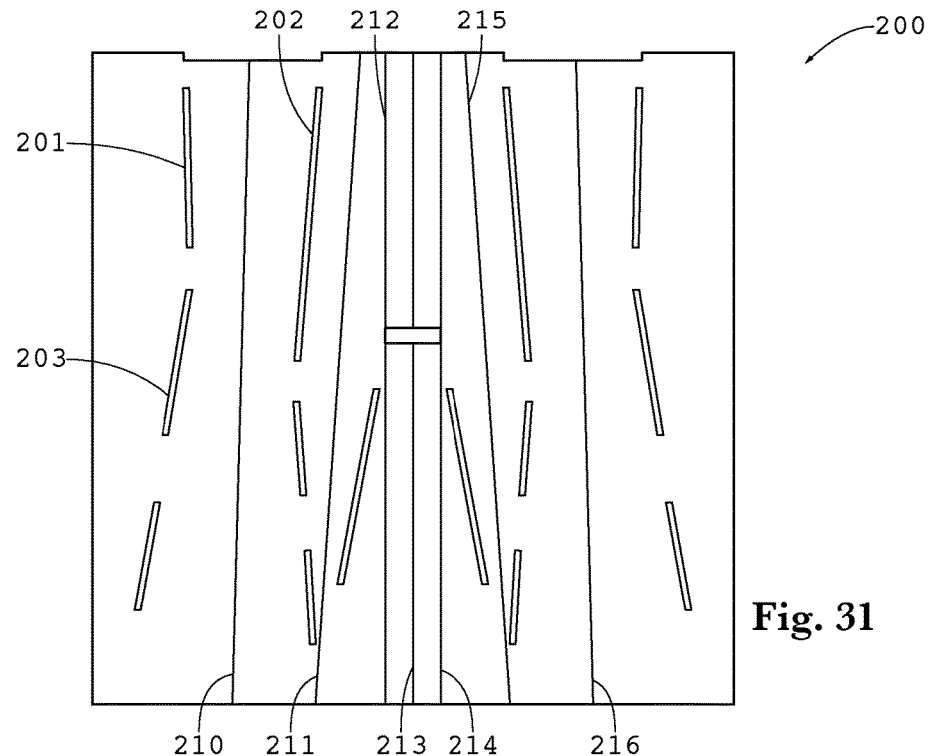
FIG. 31 is a top view illustrating an alternative end cap.

The end caps 30 and 32 are relatively rigid, and preferably planar, sheets of material, such as paperboard as an example, and the end caps 30 and 32 are not desirably flexible. That is, the end caps 30 and 32 are not desirably bent or folded substantially during normal use. An alternative to the end caps 30 and 32 shown in FIGS. 2-5, 8, and 25-28 is the end cap 200 shown in FIG. 31. This is a panel of relatively rigid material that has slots 201, 202 and 203 through which tabs from a support backing are inserted. The support backing and filtration material used with any alternative end cap described herein may be the same as the support backing and filtration material described above, or may be modified by the person of ordinary skill from those described herein. Furthermore, although slots are formed in the end cap 200 through which tabs from a support backing are inserted, alternative fasteners and attaching means between any end cap and any support backing are contemplated. For example, the support backing may be simply adhered to the end cap or caps using any acceptable adhesive, staples or sewing. Any other suitable joining means or mechanisms may be substituted.

The end cap 200 is made of relatively rigid material that may have preferred hinge lines 210, 211, 212, 213 (hinge line 213 is optional), 214, 215 and 216 formed therein. These hinge lines 210-216 define the edges of rigid pleat regions, and permit the end cap 200 to bend and fold as described herein to a pleated configuration. This is for the purpose of collapsing a pleated support backing, even when the pleated support is mounted to the end cap 200.

The hinge lines 210-216 may be weakened areas of the end cap 200 along which the end cap 200 bends preferentially as compared to the rigid pleat regions of the end cap 200. Such weakened areas may be created by perforations, scoring, locally thinner regions of material, or any other means for locally weakening the material of the end cap 200 along the hinge lines 210-216 to permit bending along the hinge lines 210-216. The hinge lines 210-216 allow the end cap 200 to collapse within the plane of the end cap 200 to a pleated configuration by bending the relatively rigid pleat regions, which are between and outside of the hinge lines 210-216, about the hinge lines 210-216. Collapsing the end cap 200 in the manner of a pleated structure permits the end cap 200 to fold along with, and in the same direction as, the support backing when the support backing is attached to the end cap 200. Collapsing may occur prior to shipping so the end user may merely expand the collapsed structure, install it in a housing, such as the housing 50, and use the finished filter.

Figure 32:
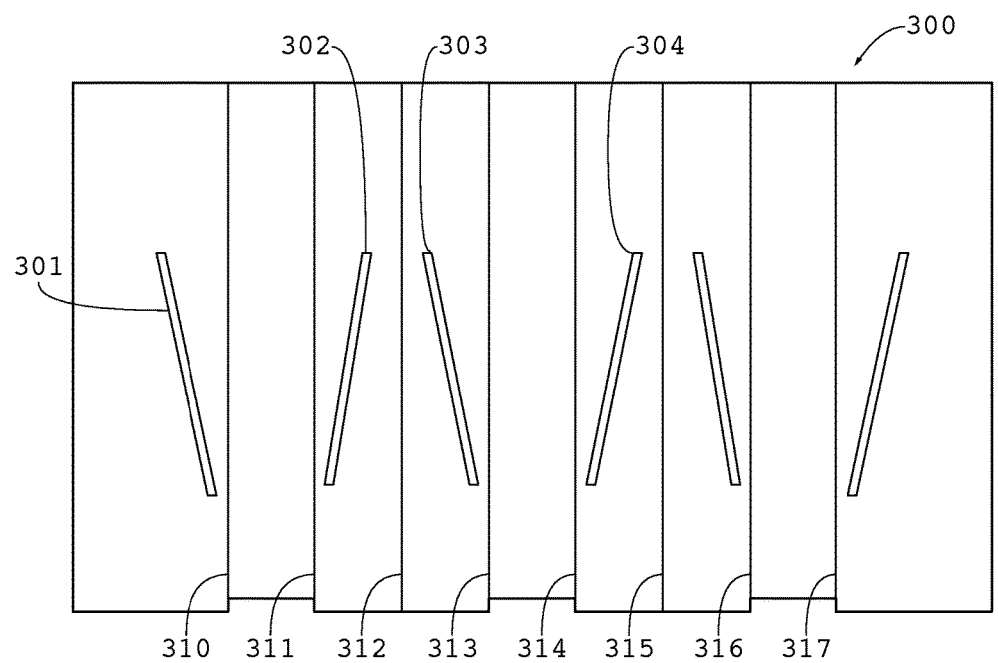
FIG. 32 is a top view illustrating an alternative end cap.

Another alternative end cap 300 is shown in FIG. 32 having slots 301, 302 and 303 through which tabs from a support backing may be inserted as described above for the end caps 200, 30 and 32. The end cap 300 is a relatively rigid panel similar to the end cap 200 with preferred hinge lines 310, 311, 312, 313, 314, 315, 316 and 317. The hinge lines 310-317 may be weakened areas of the end cap 300 along which the end cap 300 bends preferentially as compared to the remaining regions of the end cap 300. Such weakened areas may be created by perforations, scoring, locally thinner regions of material, or any other means for locally weakening the material of the end cap 300 along the hinge lines 310-317. The hinge lines 310-317 allow the end cap 300 to collapse by bending the relatively rigid pleat regions, which are defined between and outside of the hinge lines 310-317, about the hinge lines 310-317. Collapsing the end cap 300 in this direction permits the end cap 300 to fold along with, and in the same direction as, a support backing when the support backing is attached to the end cap 300. Collapsing may occur prior to shipping so the end user may merely expand the collapsed structure, install in a housing, such as the housing 50, and use the finished filter.

Figure 33:
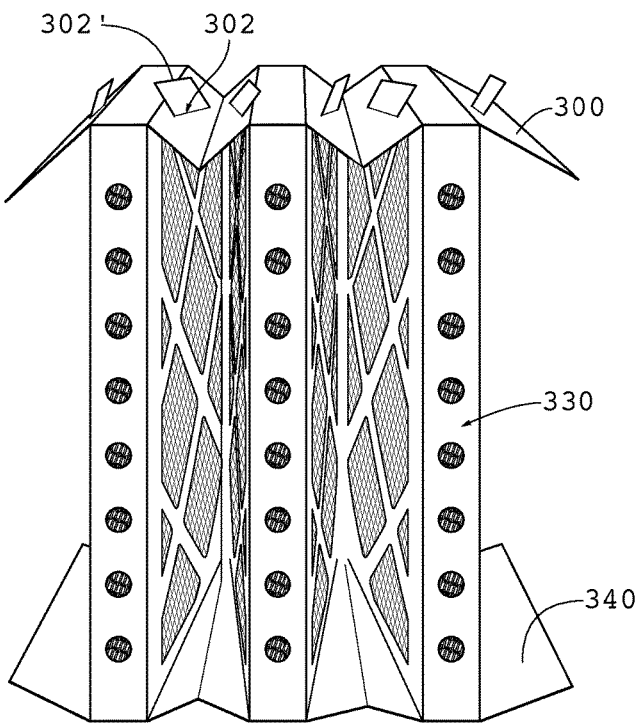
FIG. 33 is a view in perspective illustrating an alternative combination of the end cap of FIG. 32 and a support backing in a relaxed configuration.

As shown in FIG. 33, the end cap 300 is mounted, along with another end cap 340 that is a mirror image of the end cap 300, to a support backing 330 that has filtration material on it as described above for the support backing 10. As an example of the many tabs on the support backing 330 that extend through slots in the end cap 300, and the opposite end cap 340, the tab 302' extends through the slot 302 in the end cap 300, in the manner described above for the embodiment shown and described in association with FIGS. 1-10. In this manner, the end caps 300 and 340 are mounted to the support backing 330. Any other suitable attachment is contemplated. When the support backing 330 is partially collapsed, as shown in FIG. 33, the attached end caps 300 and 340 collapse along their hinge lines 310-317 to the positions shown. Thus, the end caps 300 and 340 may be described as pleated when partially or fully collapsed.

Figure 34:
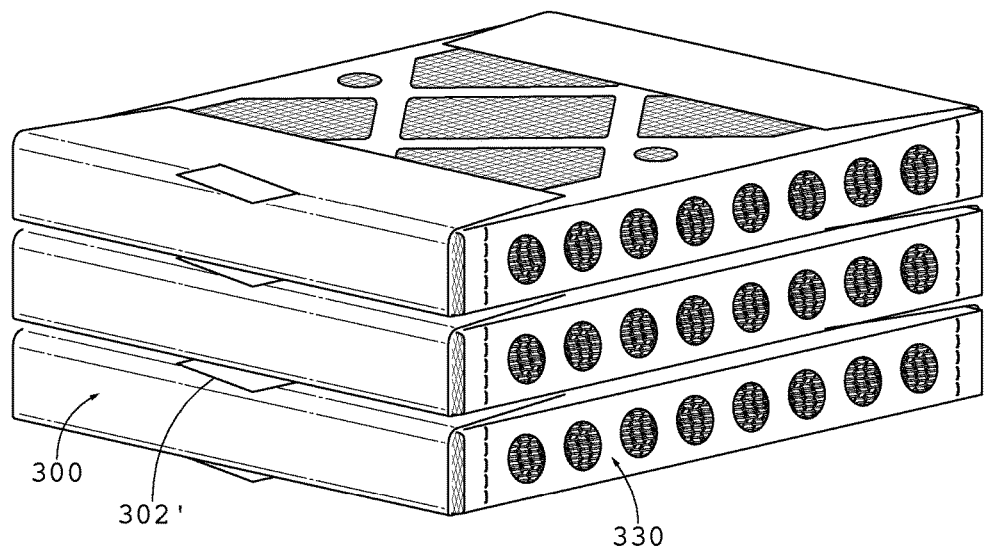
FIG. 34 is a view in perspective illustrating the embodiment of FIG. 33 in a collapsed or compressed configuration.

When the support backing 330 is completely collapsed, as shown in FIG. 34, the pleat regions of the end cap 300 and the end cap 340 (which is not visible in FIG. 34) are folded and compressed even further. Some of the rigid regions of the end caps 300 and 340 may be folded inwardly to insert between the pleated panels of the support backing 330, and this presents a compact structure with few protrusions. The tabs extending through the end caps 300 and 340, such as the tab 302' shown in FIGS. 33 and 34, may extend out into the channels formed by the pleat regions of the end caps 300 and 340. In other embodiments, there may be no protrusion of such tabs. The combination of the support backing 330 and filtration material with the end caps 300 and 340 may be maintained in a compact structure shown in FIG. 34 by inserting the combination in a box, bag, or other container or by other fasteners to retain this compact configuration until the product is about to be used.

Figure 35:
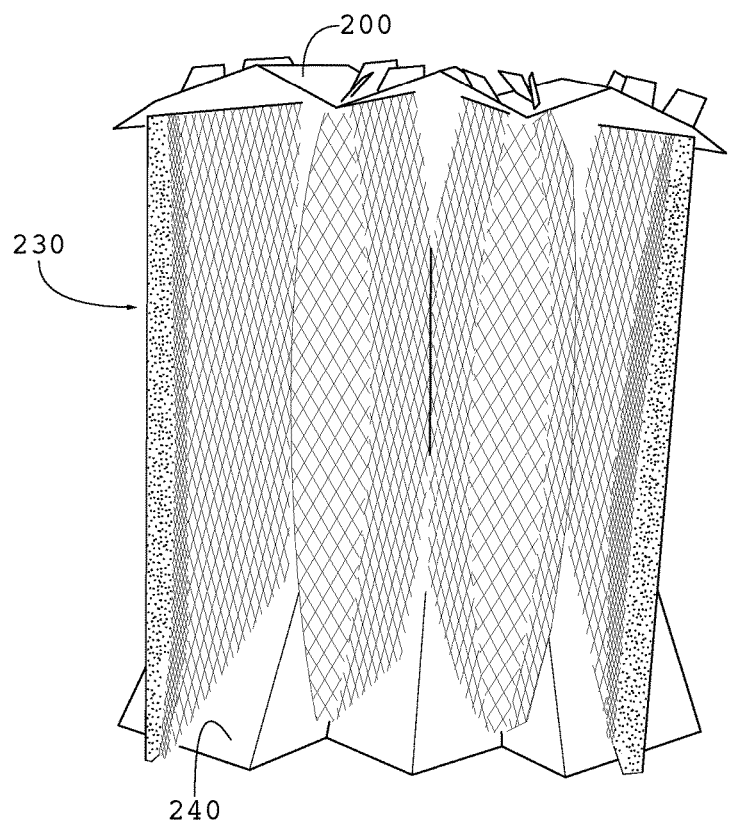
FIG. 35 is a view in perspective illustrating an alternative combination of the end cap of FIG. 31 and a support backing in a relaxed configuration.
Figure 36:
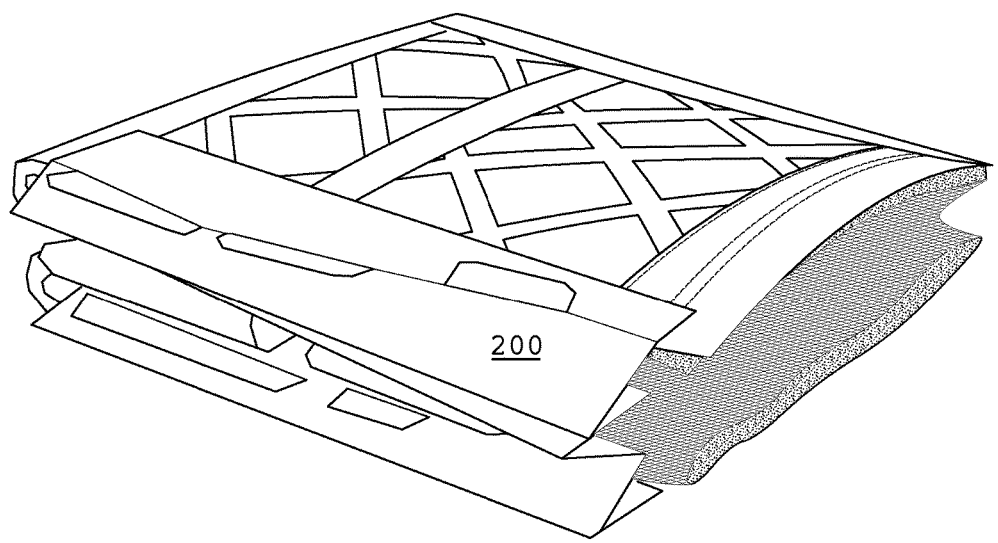
FIG. 36 is a view in perspective illustrating the embodiment of FIG. 34 in a collapsed or compressed configuration.

In FIGS. 35 and 36 the end cap 200, along with a substantially identical end cap 240, may be attached to a support backing 230 that may be similar to the support backing 10 and 330 described above. The end caps 200 and 240 may be pleated differently than the end caps 300 and 340. The end caps 200 and 240 are mounted to a support backing 230 with tabs extending through slots formed in the end caps 400 and 440, and the support backing 230 and filtration material is in accordance with the other support backings and filtration material described above. Alternative attachment means and filtration material are contemplated. The end caps 200 and 240 have relatively rigid pleat regions similar to the end caps 300 and 340 described above, and slots through which tabs from the support backing 230 are inserted. The end cap 240 is substantially identical to the end cap 200 and has preferred hinge lines that may be weakened areas along which the end cap bends preferentially as compared to the relatively rigid pleat regions of the end caps.

It should be noted that when the end caps 200 and 240 are pleated, they do not fold inwardly and insert between the pleated panels of the support backing 230, as the end caps 300 and 340 do with the support backing 330 in the embodiment of FIGS. 32-34. Instead, the rigid pleat regions of the end cap 200, defined by the hinge lines 210-216, and the rigid pleat regions of the end cap 240 between similar hinge lines formed on the end cap 240, fold away from the support backing 230 as shown in FIGS. 35 and 36.

The location of each of the hinge lines described herein, such as the hinge lines 210-216, may be generally between two slots or aligned slots, and more preferably each of the hinge lines 210-216 preferably bisects a corresponding pair of slots or pair of slot lines formed for receiving corresponding tabs of the support backing. As an example, the hinge line 210 essentially bisects the slots that are aligned in series with the slots 201 and 202. It is apparent that the hinge line 210 is substantially equidistant from the slots 201 and 202. By being positioned equidistant from slots or an aligned series of slots, the hinge lines 210-216 permit folding of the rigid pleat regions of the end caps along lines that are equally spaced from the tabs that extend from the attached panels of a support backing (e.g., the support backing 230 shown in FIG. 35).

Alternatively, the location of some of the hinge lines 310-317 may be generally between two slots or aligned slots, and other of the hinge lines 310-317 may be in pairs between two slots or aligned slots. Each of the hinge lines 312 and 315 may bisect a corresponding pair of slots or pair of slot lines formed for receiving corresponding tabs of the support backing. The pairs of hinge lines 310 and 311, the pairs of hinge lines 313 and 314, and the pairs of hinge lines 316 and 317 are spaced from corresponding slots to permit folding of the end cap 300 around blunt-ended pleated panels of the support backing 330 (see FIGS. 33 and 34). As an example, the hinge line 312 essentially bisects the slots 302 and 303, such that the hinge line 312 is substantially equidistant from the slots 302 and 303. By being positioned equidistant from slots or aligned slots, the hinge line 312 permits folding of the rigid pleat regions of the end cap 300 along lines that are equally spaced from the tabs that extend from the attached panels of a support backing (e.g., the support backing 330 shown in FIG. 33) when collapsing into a pleated configuration. Furthermore, the pairs of hinge lines 310 and 311, which are equally spaced from the adjacent slots 301 and 302, do not bisect the space therebetween. This is because the hinge lines 310 and 311 are deliberately formed to accommodate the shape of the support backing 330. The person of ordinary skill will understand from the description herein how to modify the position of the hinge lines to accomplish the purpose of the invention.

When any of the embodiments described above in association with FIGS. 31-36 is placed in a housing, such as the housing 50 shown in FIGS. 4-14, the collapsed (pleated) end caps are preferably first expanded, although this is not a required sequence. This expansion is preferably carried out to the point that the end caps are as close to planar as they will be in their useful life, much like the end caps 30 and 32 are planar in their operable position described above. Expanding the previously collapsed and pleated end caps opens the pleated support backing to its panels' fully expanded configuration so the filter is in an operable state and can be used to filter. Without reaching its fully expanded configuration, or very close thereto, the collapsed support backing and filtration material described herein do not function well as a filter. When expanded, they function extremely well as a filter. Thus, it is desirable that any previously collapsed combination of end caps and support backing be expanded to at least about 90%, more preferably at least about 95%, and most preferably at least about 96%, 97%, 98% or 99% of the fully expanded configuration. Any of these amounts of expansion defines a "substantial" amount, as in a "substantially expanded" support backing, a "substantially planar" end cap, and others discussed herein.

The combination of the pleated end caps 200 and 240 and the filtration material and support backing 230 shown in FIG. 36, which is in a fully compressed (also called "collapsed") state by virtue of a force being applied to maintain it in that state, may be released in order to allow the combination to attain a "relaxed" state, which is shown in FIG. 35 with the end caps 200 and 240 in a partially-pleated state. FIG. 35 shows the state the combination attains when it has been collapsed, but then the force holding it in the collapsed configuration is released. Typically, the fully compressed state requires a force, exerted by equipment, a person's hands, or another restraint, such as a box, a band or a wrapping, in order to overcome the resistance of the combined support backing 230 and the end caps 200 and 240 to fully collapse. This resistance is due to the inherent spring effect of the materials of which the support backing 230 and the end caps 200 and 240 are constructed. Once this compressive force is released, the combination achieves the relaxed state shown in FIG. 35 due to the spring effect. This release of the force does not completely expand the combination, however, but allows the combination to reach a neutral or relaxed state that is intermediate the fully compressed and fully expanded states.

The combination in a relaxed, partially pleated state may be placed in a housing, such as the housing 50, so the end cap 240 seats against the bottom wall of the housing 50. The opposite end cap 200 is adjacent the end flaps 56-59 of the housing 50, and as these end flaps 56-59 are closed over the end cap 200, the housing 50 applies a force to the combination in a direction along the planes of the panels of the support backing 230. This force expands the relaxed, partially-pleated end caps 200 and 240 further toward a substantially planar configuration as the pleat regions folded away from the support backing are pushed on by the end flaps. These pleat regions folded away from the pleated backing 230, which is in a direction opposite to one another, effectively elongates the combination of the support backing 230 and the end caps 200 and 240. Thus, when the combination is compressed longitudinally by the housing, the protruding rigid pleat regions of the end caps 200 and 240 hinge back toward a substantially planar shape, thereby causing the end caps 200 and 240 to expand laterally and flatten out. With sufficient force, the end caps 200 and 240 attain a substantially planar shape, which is much like when the end caps 30 and 32 are in an operable position in the housing 50 as described above. As the end caps 200 and 240 are expanded laterally to a flattened position, this applies a lateral force to the support backing 230 that expands the support backing 230 laterally to a fully, or at least substantially, expanded condition.

One advantage of the collapsible end caps described above is that they take up less space when they are combined with a support backing and collapsed, than when the combination is in a fully expanded condition. Furthermore, the combination is fully assembled for the end user, so no attachment of end caps to support backing is required. When the end user receives the previously-collapsed combination, he simply expands it by hand, and this provides an easier experience for the end user who does not have to attach end caps to a support backing. Instead, he simply expands and then installs the finished product in the housing so the filter is in its operable position for filtration. Thus, the invention provides a filter that may be collapsed for shipping and storage, but that also is easier for the end user to install, and reduces problems that may otherwise arise with products that do not fully expand upon installation.

Figure 37:
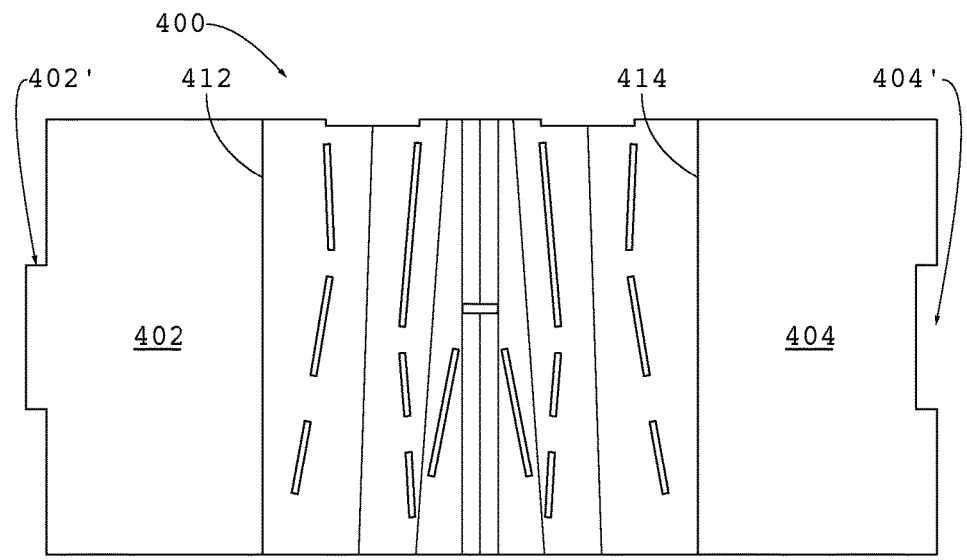
FIG. 37 is a top view illustrating an alternative end cap with stabilizing panels.

Other structures for expanding the previously-collapsed combinations of end caps and support backings shown and described in association with FIGS. 31-36 are contemplated, and some of these structures are shown and described in association with FIGS. 37-40. The end cap 400 in FIG. 37 is substantially identical to the end cap 200 shown in FIG. 31, with the exception that first and second stabilizing panels 402 and 404 are integral to the end cap 400 and mounted at opposite ends of the end cap 400. The stabilizing panels 402 and 404 may be made of the same material as the end caps, and are hingedly mounted along the corresponding hinge lines 412 and 414 to opposite edges of, the end cap 400. The stabilizing panels 402 and 404 are substantially rigid and may extend more than halfway along the fully expanded length of a support backing with which the end cap 400 is used, such as the support backing 430 shown in FIG. 38. Similarly, the stabilizing panels 402 and 404 may extend more than halfway along the fully expanded length of the end cap 400. With this relationship, each stabilizing panel may overlap a stabilizing panel on the same end cap and/or a stabilizing panel on an opposing end cap.

Two substantially identical end caps 400 and 440 are preferably used with the support backing 430. The second end cap 440 shown in FIG. 38 has corresponding stabilizing panels, such as the stabilizing panel 442 and a stabilizing panel 444 (not visible in FIG. 38) that is identical to the stabilizing panel 402.

The stabilizing panels of the end caps 400 and 440 may be similar to one another, and may have different, but cooperating, fastening elements thereon. Each stabilizing panel preferably has a fastening element on its distal end that cooperates with a fastening element on the distal end of the same end cap's other stabilizing panel. In the example shown in FIGS. 37-38, the fastening elements are a tongue 402' and a groove 404' that interlock with each other. The panel 442 has a groove 442' and a tongue (not visible, but identical to the tongue 402'). The combination of the end caps 400 and 440 with the support backing 430 is shown in FIG. 38 assembled in a similar manner as the combination shown and described in association with FIGS. 31-36.

Figure 38:
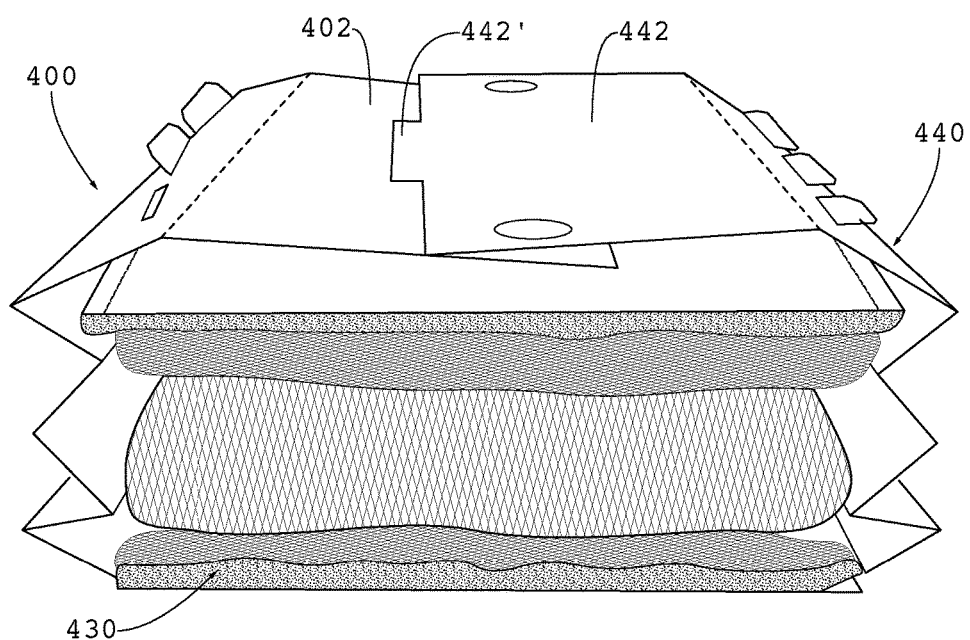
FIG. 38 is an end view in perspective illustrating the end cap of FIG. 37 in combination with a support backing.

In order to mount the end caps 400 and 440 to the support backing 430, the tabs at ends of the pleated panels insert through the slots in the end caps 400 and 440, and the combination has the appearance shown in FIG. 38. The stabilizing panels 402, 404, 442, and 444 of the opposing end caps 400 and 440 overlap one another on opposing sides when the pleated support 430 is in the relaxed configuration shown. In this configuration, the pleated support 430 may be collapsed along its hinge lines (similarly to that structure described above for the combination of the end caps 200 and 240 and the support backing 230 by folding along hinge lines 210-216). In the collapsed and relaxed configurations, the stabilizing panels 402, 404, 442, and 444 rest against the sides of the support backing 430 as shown in FIG. 38.

Figure 39:
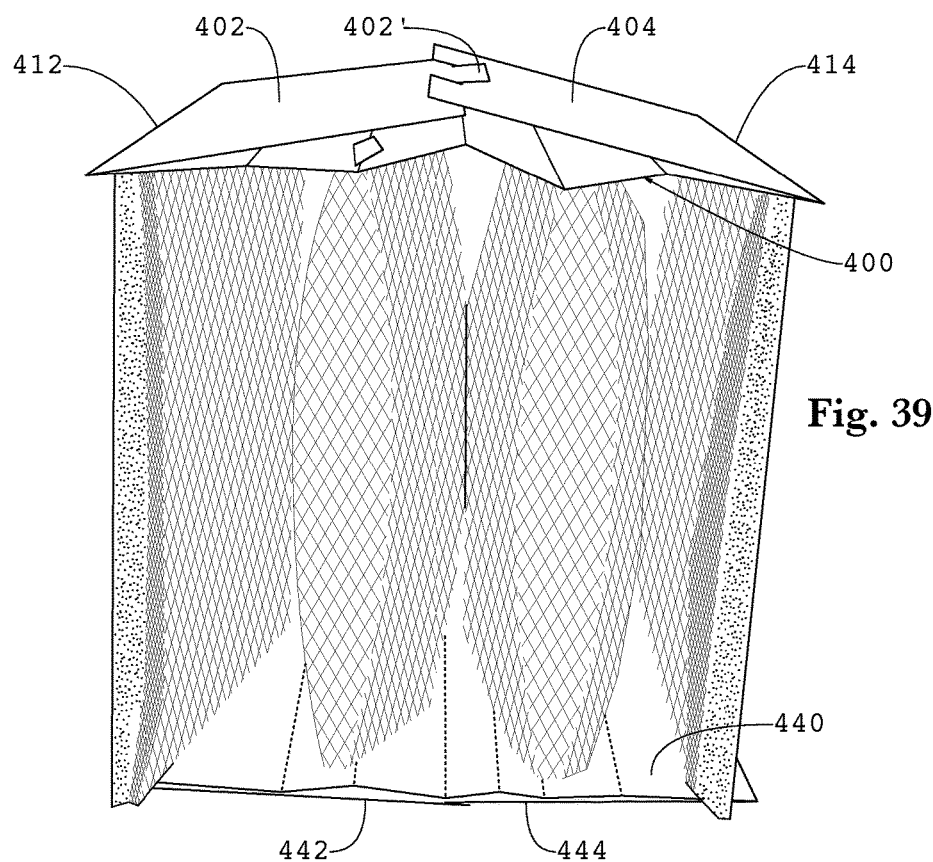
FIG. 39 is a view in perspective illustrating the end cap with stabilizing panels in combination with a support backing.

In order to expand the pleated support 430 from a relaxed configuration, the support backing 430 is expanded laterally, the rigid pleat regions of the end caps 400 and 440 are bent along their respective hinge lines toward a more planar configuration as described above. The stabilizing panels are hinged from the positions shown in FIG. 38 around and over their respective end caps as shown in FIG. 39. In the state shown in FIG. 39, the stabilizing panels 402 and 404 have been disposed with the distal edges near one another. The tongue 402' may be inserted in the groove 404' to fasten the two stabilizing panels 402 and 404 to one another. The same is carried out with the end cap 440 and the stabilizing panels 442 and 444. As shown, the weight of the combination causes the stabilizing panels 442 and 444 to be essentially parallel to the end cap 440, which flattens the end cap 440 as shown to a substantially planar configuration. The stabilizing panels 402 and 404 are not at first parallel to the end cap 400, but form a triangle (when viewed from the side) with the stabilizing panel 402 forming one leg of the triangle, the stabilizing panel 404 forming another leg of the triangle and the third leg of the triangle extending between the hinge lines 412 and 414. Because the previously-collapsed end cap 400 has some spring effect, a force is required to flatten it from the relaxed state.

When the combination shown in FIG. 39 is placed in a housing, such as the housing 50 shown and described above, and the flaps 56-59 are closed over the combination, the end cap 400 is flattened by the flaps 56-59 being forced against the stabilizing panels. Complete flattening of the end cap 400 (reaching a substantially planar configuration) is caused by the stabilizing panels 402 and 404. This occurs when the stabilizing panels 402 and 404 are pressed on by the housing flaps 56-59, whereby the previously-formed triangle is flattened so that a parallel arrangement is achieved between the stabilizing panels and the end cap. The force on the stabilizing panels 402 and 404 elongates the end cap 400 due to the inability of the stabilizing panels 402 and 404 to shorten and the ability of the end cap 400 to elongate. When the flaps 56-59 are closed, the stabilizing panels 402 and 404 (which are in a position similar to that shown in FIG. 39) simply pivot at the tongue 402' and at the hinge lines 412 and 414 and are pressed toward the end cap 400. The defined-length stabilizing panels apply an expanding force to the end cap. The end cap 400 elongates (as the stabilizing panels pivot) to compensate for the greater length of the stabilizing panels 402 and 404 compared either the collapsed or the relaxed end cap 400. As the panels 402 and 404 move into a position parallel to the end cap 400, the end cap 400 elongates to a substantially planar configuration that is about the same length as the combined stabilizing panels 402 and 404, and achieves this once the stabilizing panels 402 and 404 become substantially parallel with the end cap 400.

It is contemplated that only one pair of stabilizing panels (e.g., the stabilizing panels 402 and 404) may be used at one end of the combination shown in FIG. 39. Such a structure may be useful if a different means for flattening the opposing end cap 440 is used. Thus, each of the end cap expanding means described herein may be used in identical or similar pairs, but each may alternatively be mixed with other means.

Figure 40:
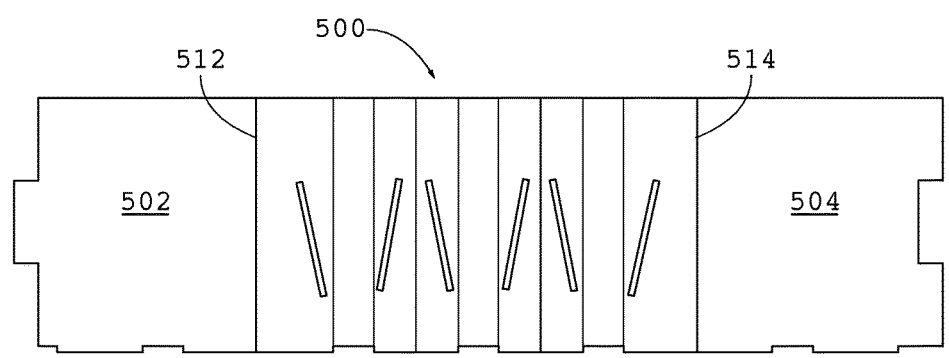
FIG. 40 is a top view illustrating an alternative end cap with stabilizing panels.

Another end cap 500 is shown in FIG. 40. The end cap 500 in FIG. 40 is substantially identical to the end cap 300 shown in FIG. 32, and the first and second stabilizing panels 502 and 504 are integral to the end cap 500 and mounted at opposite edges of the end cap 500. The stabilizing panels 502 and 504 may be made of the same material as the end cap 500, and are hingedly mounted along the corresponding hinge lines 512 and 514 to opposite edges of, the end cap 500. The stabilizing panels 502 and 504 are substantially rigid and may extend more than halfway along the length of a support backing with which the end cap 500 is used, such as the support backing 430 shown in FIG. 38.

Figure 58:
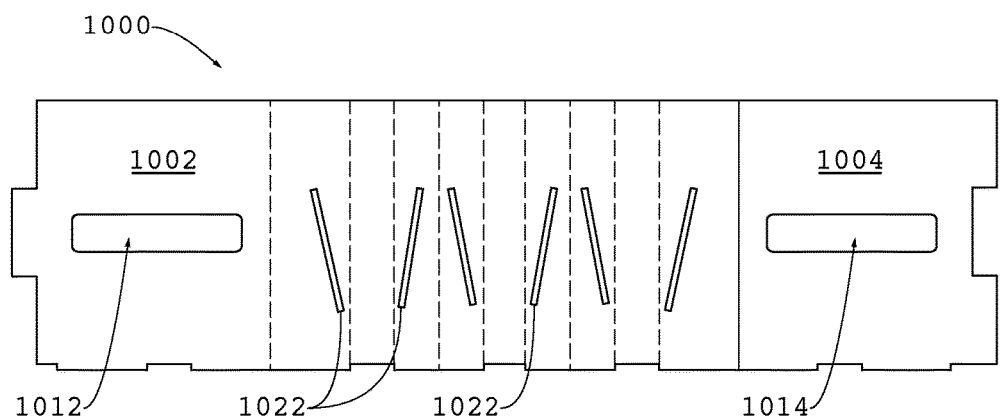
FIG. 58 is a top view illustrating an alternative end cap.
Figure 59:
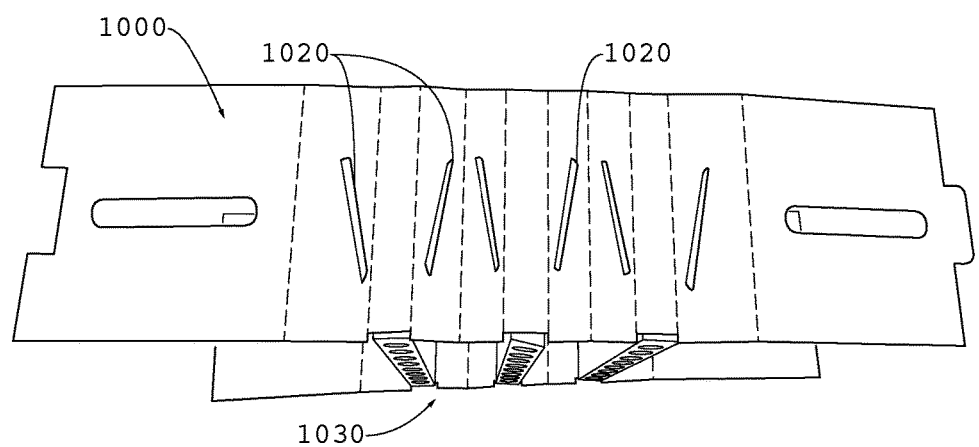
FIG. 59 is a top view in perspective illustrating the end cap of FIG. 58 in an operable position on a support backing.
Figure 60:
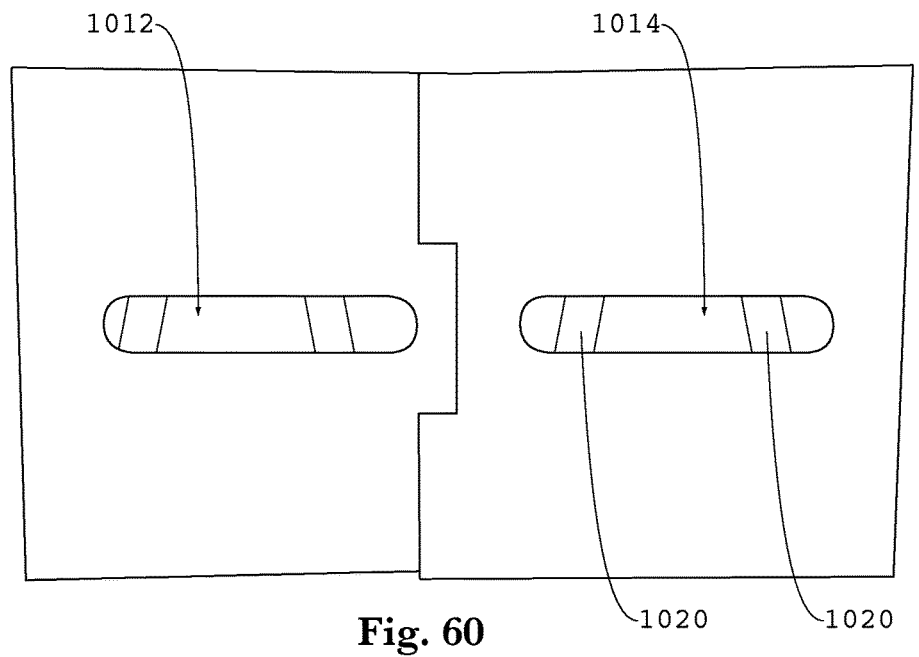
FIG. 60 is a top view illustrating the embodiment of FIG. 58 in an operable position.

Another alternative end cap 1000 is shown in FIGS. 58-60. This end cap is similar to the end cap 500, with small window openings 1012 and 1014 formed in the stabilizing panels 1002 and 1004, respectively. The openings 1012 and 1014 allow the tabs 1020 that extend from the support backing 1030 (FIG. 59) to be more easily viewed, even when they are behind the stabilizing panels 1002 and 1004, when the tabs 1020 are folded down, as shown in FIG. 60. Instead of reaching between the stabilizing panels and the attached end cap, one can simply swipe a finger or two that is inserted through the openings 1012 and 1014 toward the center and all of the tabs fold down. Similarly, one may view all tabs and see that they are folded properly. The openings are made small enough to avoid having a negative impact on the rigidity of the stabilizing panel. The same process could be used for the stabilizing panels 402 and 404, but would require two or more windows to accommodate the longer series of tabs in the support backing with which this end cap is used. The openings 1012 and 1014 are optional if tabs secure the end cap to the support backing.

Two substantially identical end caps are preferably used with the pleated support 430. The second end cap may have corresponding stabilizing panels that are identical to the stabilizing panels 502 and 504. The stabilizing panels of both end caps are similar to one another, but may have different fastening elements thereon. Each stabilizing panel preferably has a fastening element on its distal end that cooperates with a fastener element on the distal end of the same end cap's other stabilizing panel. The end cap 500 and its cooperating end cap may be mounted to the pleated support 430 much like the end caps 400 and 440 described above. The stabilizing panels of each end cap may operate as the stabilizing panels 402 and 404 or 442 and 444 described for the embodiment of FIGS. 37-39.

The support backing 10 is used with the end caps 30 and 32 in order to align each of the support backing panels relative to one another and retain the panels in the aligned position shown in FIG. 26. An alternative embodiment support backing 610 is shown in FIGS. 41-46. The support backing 610 is similar to the support backing 10 of FIG. 1 with regard to the material, the formation of openings therein for air or another gas to flow through, and the hinge lines formed therein to form preferential bending locations at the hinge lines and the attachment of filtration material to one face thereof. The support backing 610 also has differences. Rather than being used with end caps as described above for the support backing 10, the support backing 610 has integrated webs 620, 621, 622, 623 and 624. The webs 620-624 may each extend in a co-planar fashion from a panel of the support backing 610, and may pivot relative to the panel along preferred hinge lines similar to the hinge lines 210-216 formed on the end cap 200.

It is important to note that only one-half of the support backing of the embodiment of FIGS. 1-16 is shown in FIG. 1 as reference numeral 10. The support backing 10 shown in FIG. 1 has three panels that may be bent at angles relative to one another to form the structure best shown in FIG. 26, and the support 10 of FIG. 1 is preferably used with another identical structure to that shown in FIG. 1 to form the six panel support backing shown in FIG. 7. The same principle applies to the support backing 610, because the support backing 610 is chiral inasmuch as a full support backing may be constructed by joining the mirror image of the support backing 610 (see FIG. 42) to the support backing 610. The support backing 710 of FIG. 42 is the chiral image of FIG. 41, and the support backing 710 has integrated webs 720, 721, 722, 723 and 724. The webs 720-724 may each extend in a co-planar fashion from a panel of the support backing 710, and may pivot relative to the panel along preferred hinge lines.

As long as the support backing 610 is constructed of a material that is symmetric on both faces, the same cut part can be used and the support may be considered identical, because its mirror image can be produced by flipping the support about edge 630. Note that the application of media would induce chirality again, so the media must be applied to half of the panels turned 610 style and the other half to the 710 style.

In one contemplated embodiment, the support backings 610 and 710 may be joined at the strips 630 and 730 with the circular apertures aligned. The strips 630 and 730 of the supports 610 and 710 overlap as part of a connecting bridge. Of course, the support 610 could simply be made longer to have the same number of panels as the combination of panels 610 and 710, but this may affect the cost to manufacture and ship.

The webs 620-624 and 720-724 of the connected support backings 610, 710 may fasten to an adjacent web or panel of the support backings 610, 710 after pivoting to maintain pleated panels that connect together at a desired angle, as shown in FIGS. 41-45. The webs 622-624 are at one end of the support 610, along with the webs 720 and 721 on the support 710 (FIG. 44), which correspond to the webs 620 and 621 of the support 610. The web 624 folds into the web 721 and the web 724 folds into the web 621, which bridges the two halves. The web 623 may attach to the panel from which the web 624 extends, and the web 622 attaches to the panel from which the web 623 extends. At the opposite end, the web 621 may attach to the panel from which the web 620 extends and the web 620 connects to the spare tab 626.

The webs 620-621 are disposed on opposing panel ends from the webs 622-624 in order to maintain panels at the desired relative angle at both ends of the support backing 610, 710. The webs 720-721 are disposed on opposing panel ends from the webs 722-724 in order to maintain panels at the desired relative angle at both ends of the support backing 610, 710.

Figure 41:
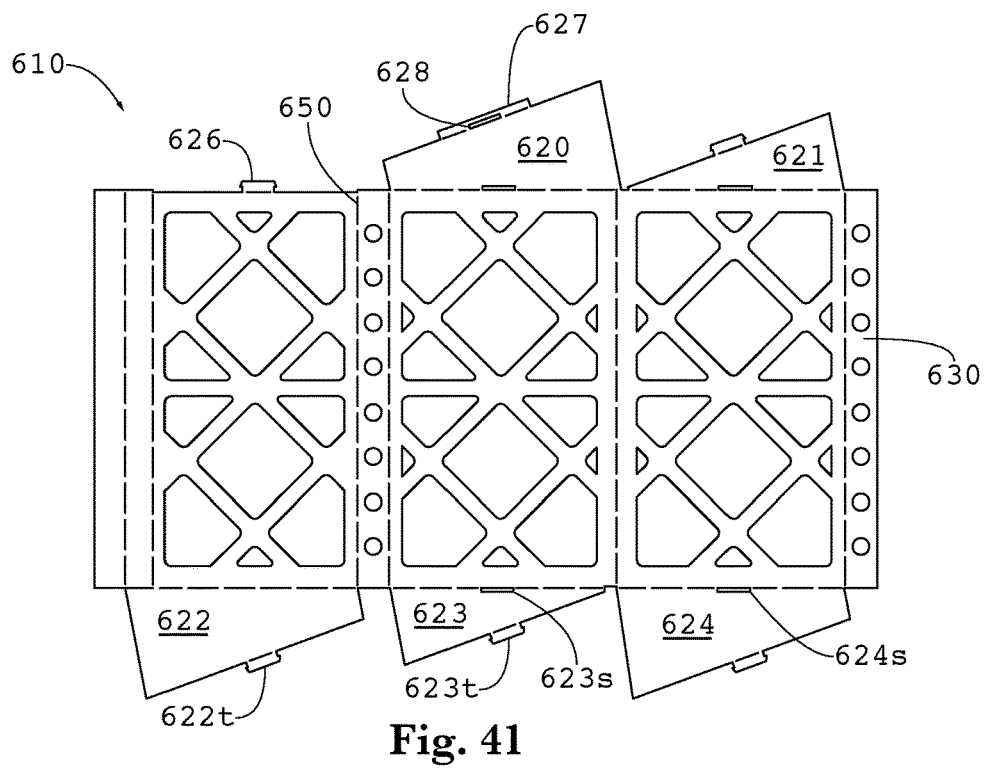
FIG. 41 is a top view illustrating an alternative support backing.
Figure 42:
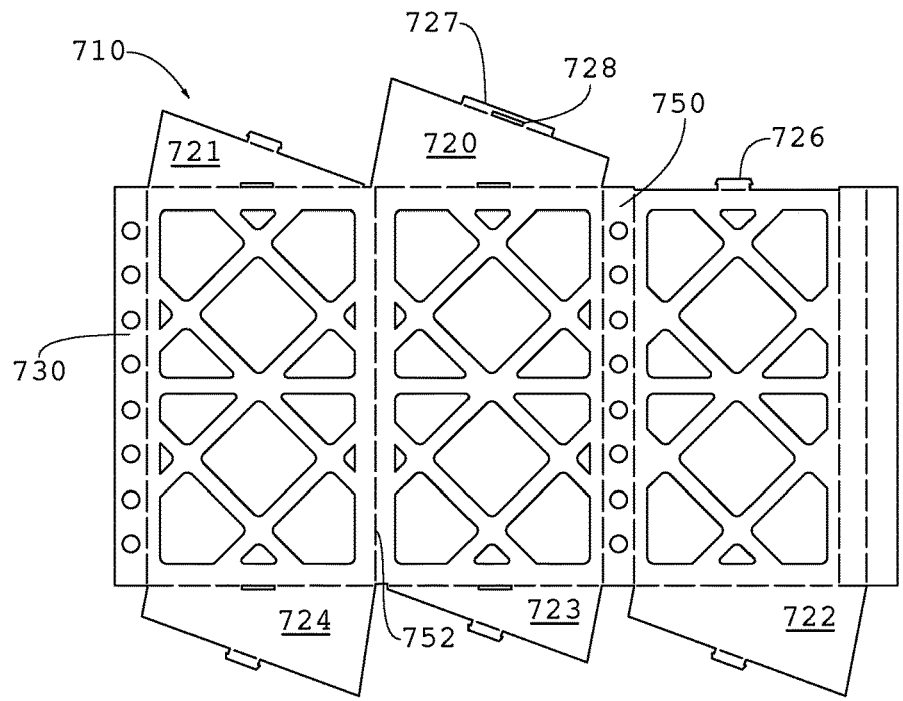
FIG. 42 is a top view illustrating an alternative support backing that is a mirror image of the structure shown in FIG. 41.
Figure 43:
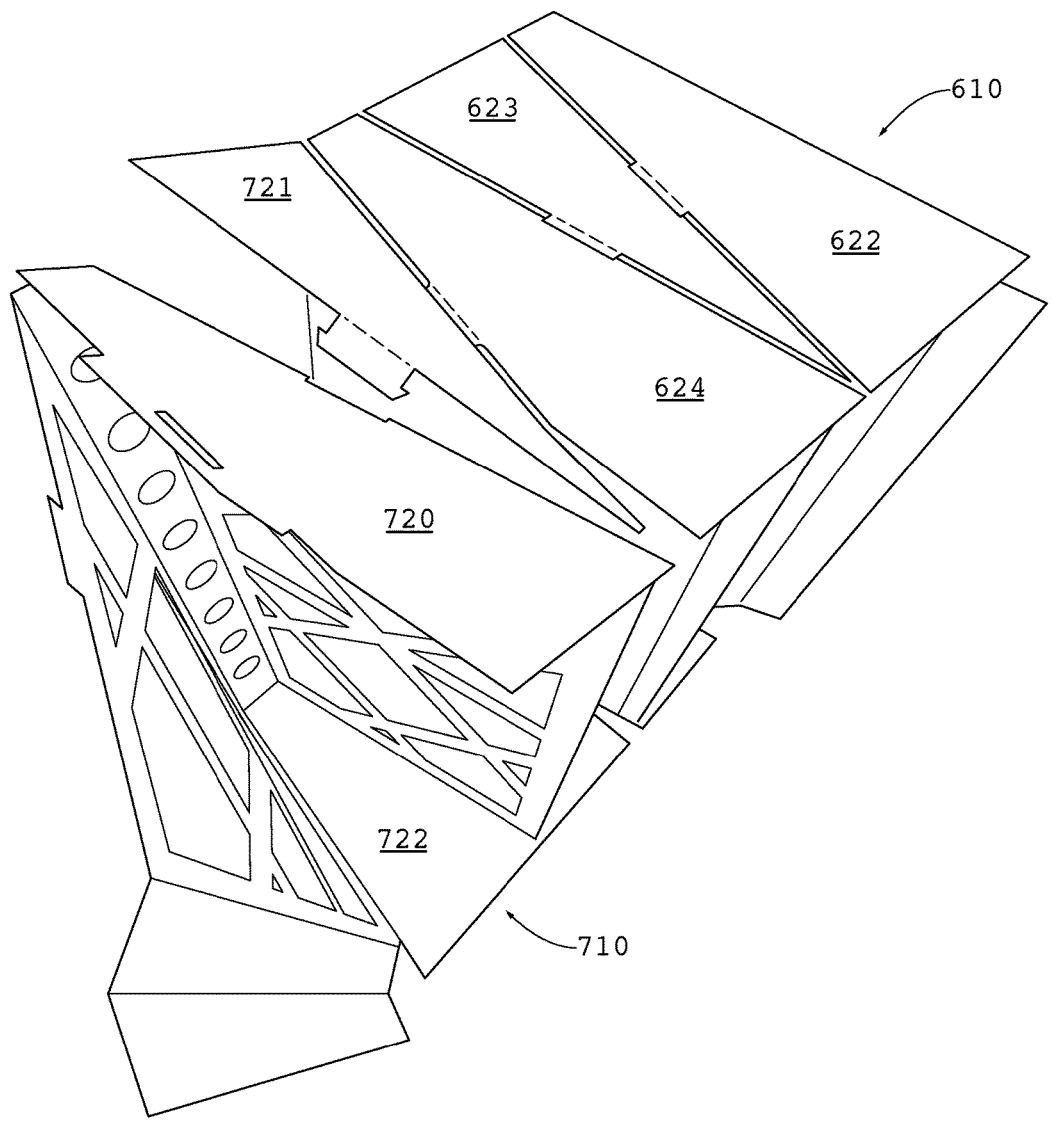
FIG. 43 is a view in perspective illustrating the embodiments of FIGS. 41 and 42 in an expanded configuration.
Figure 44:
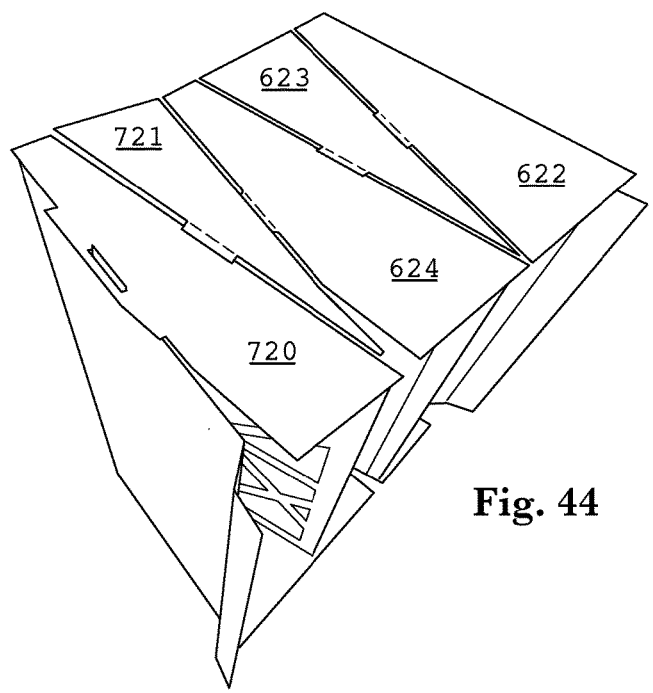
FIG. 44 is a view in perspective illustrating the embodiment of FIG. 43 in an expanded configuration with all webs mounted to adjacent panels.

The complete support backing 610, 710 is preferably manufactured flat as shown in FIGS. 41 and 42, and may then be collapsed to a small size by folding to a flat pleated configuration along the hinge lines 650, 652, 750 and 752 between the panels. Collapse of the support backing 610, 710 may occur before or after a filtration material (not shown) is attached thereto. Once it is desired to expand the support backing 610, 710 and insert it into a housing, such as the housing 50 as shown in FIG. 44, the support backing 610, 710 is folded into the open pleated configuration shown in FIG. 44, and the webs 622-624, 720 and 721 are folded over and attached to the adjacent panel of the support backing 610, 710 as described and shown. The same occurs at the opposite end of the support backing 610, 710.

The webs 620-624 and 720-724 may be generally triangular, as shown, because they need to fold from one panel and attach to another panel that is at an angle relative thereto. However, other shapes are contemplated. The webs pivot at a preferential fold line, such as by perforation, local thinning, partial cutting or any other known means.

Figure 45:
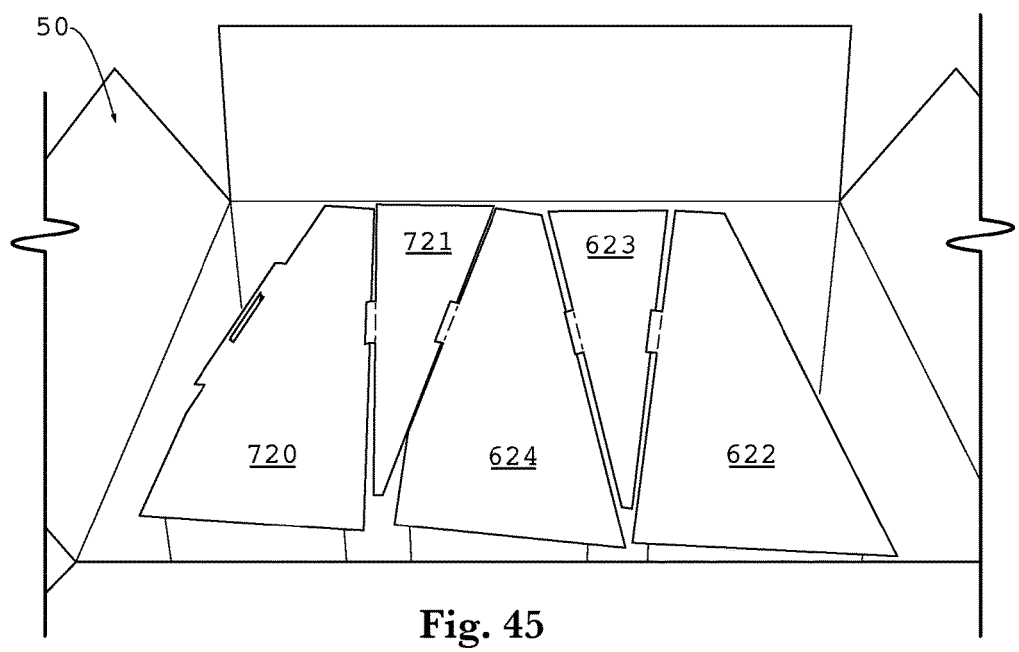
FIG. 45 is a view in perspective illustrating the embodiment of FIG. 43 in a housing.

Each web attaches to an adjacent panel by fasteners, which may be tabs that insert into slots, adhesive, staples, stitching, or any other suitable means. By folding the webs over and attaching to an adjacent panel or web, the panels of the support backing 610, 710 are held in the pleated configuration, as shown in FIGS. 44 and 45, at a desired and predetermined angle between the panels. Preferably, webs are attached on opposite ends of the support backing 610, 710 to hold the support backing 610, 710 in the pleated configuration at both ends. The support backing 610, 710 may then be placed in a housing, such as the housing 50 shown in FIG. 44, and the flaps folded over and sealed, such as with tape.

There is a preferred web folding sequence to connect the webs of the support backing 610, 710 after pleating of the panels. This sequence begins by folding the web 622 to insert its tongue 622*t* into the slot 623*s* formed in the hinge of the web 623. This is preferably performed prior to the web 623 being folded from parallel to the panel so that the slot 623*s* is as large as possible when the tongue 622*t* is inserted therein. Similarly, when the web 623 is folded, the slot 623*s* into which the tongue 622*t* is inserted becomes smaller, thereby reducing the probability that the tongue will be pulled out. Thus, when the web 623 is next folded to insert its tongue 623*t* in the slot 624*s* at the hinge of the web 624, this occurs prior to pivoting the web 624. The web 624 is pivoted down next in order to insert its tongue into the slot at the hinge of the web 721 (see FIG. 43). The webs 721 and 720 are similarly folded and fastened, with the spare tab 726 inserting into the slot 728 formed in the lip 627 at the end of the web 720. The same order occurs at the opposite end starting with the web 722 folding into the web 723 and ending with the spare tab 626 inserting into the slot 628 formed in the lip 627 at the end of the web 620. Tongues (tabs) fit into slots easier when the web whose hinge the slot if formed in is in an unfolded position. The act of folding each web actually helps lock the tongue or tab in place.

Figure 61:
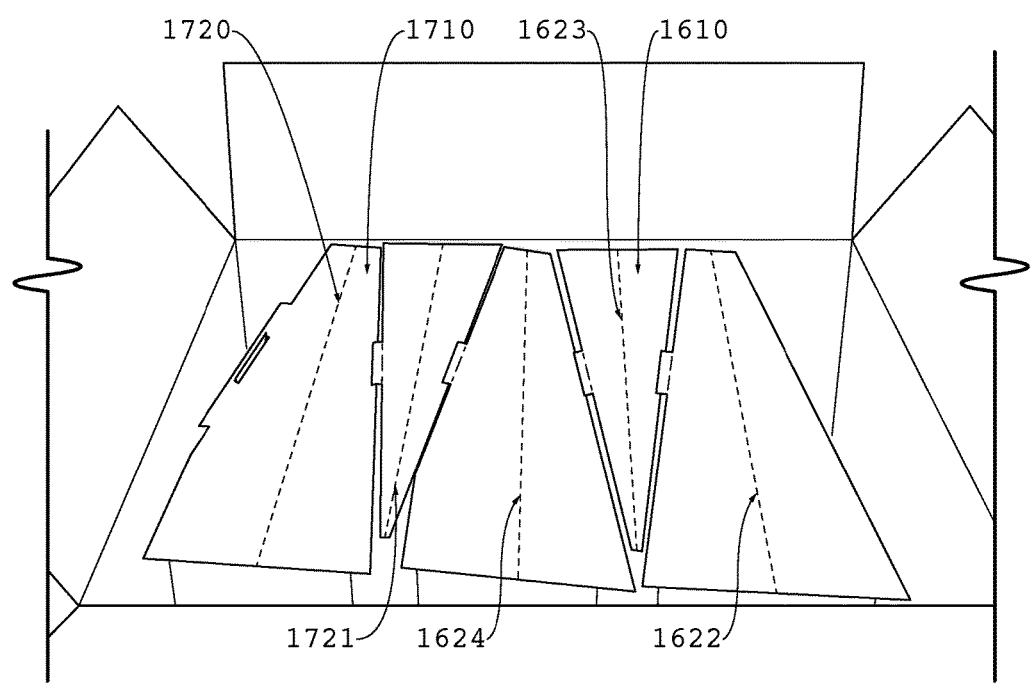
FIG. 61 is a view in perspective illustrating an alternative embodiment of the invention.

Because the support backing 610, 710 has webs that hold the panels in a pleated configuration, there is no need for end caps to perform that function. Instead, the panels of the support backing 610, 710 are fixed in the pleated configuration using the webs and then the support backing 610, 710 is placed in the housing 50. Preferably, filtration material is mounted to the support backing 610, 710 before use. The webs thus function in a similar manner as the end caps to maintain the position of each panel of the support backing 610, 710, and renders the support backing 610, 710 collapsible and expandable. In an alternative embodiment shown in FIG. 61, the webs of the support backing 1610, 1710 have hinge lines 1622, 1623, 1624, 1720 and 1721 that permit collapsing of the webs by pleating in the manner of the end caps 200 and 240 after the webs are folded over and attached to adjacent panels.

In the embodiments described and shown in relation to FIGS. 2-16, 25-30, 32-34 and 40, the panels of the support backings are all essentially the same size, and they are aligned at similar angles to one another across the width of the end caps. The pleated panels are planar from front to back, and do not change angle substantially through the filter in the direction of gas flow, as can be seen by the positions of the slots in the end cap 300. This can be understood from the angle of the slots 301-304 in the end cap 300 of FIG. 32. The flow path of gas through the filter is in the direction of the arrow, F, shown in FIG. 32, and the pleated panels covered with filtration material are aligned with the slots 301-304. The position of the panels in the embodiments of FIGS. 32-34 results in the particles of material striking a face of filtration material mounted on one of the pleated panels.

Another embodiment may be different in some of these features. For example, the embodiments shown in FIGS. 31 and 35-39 have pleated supports that vary in panel angle and length along the flow direction. These embodiments are described in more detail in relation to FIGS. 46 and following.

As shown in FIGS. 46-53, the end cap 800, which may be similar to the end cap 200, has slots 801-811 formed therein. The slots 801-811 correspond to, and receive, the tabs formed in the ends of the support backing panels. This may be the support backing 230 described above, and shown in FIG. 46 without filtration media mounted thereon in order that the panels of the support backing 230 may be visible.

The support backing 230 includes a plurality of panels 820-830 that are bent relative to adjacent panels. A filtration material, such as slit and expanded paper as shown in FIGS. 35-36, may be mounted to one (upstream) side of the support backing 230, and the end caps 800 and 840 are mounted to the tabbed ends of the panels 820-830, similarly to the end caps 200 and 240 in FIGS. 35-36.

Each of the pleated panels 820-830 may have at least one tab extending from the top end (in the orientation shown in FIG. 46), and at least one similar tab extending from the opposite, lower end. For example, the tab 820a extends in a co-planar manner from the panel 820 through the slot 808 in the end cap 800, and the tab 822a extends in a co-planar manner from the panel 822 through the slot 801. Additional tabs extend from the panels 826, 828, 830, and 832 and extend through the slots 802, 809, 803 and 804, respectively. Corresponding tabs, which are not visible but are substantially identical, extend from opposite ends of the panels 820-832 through slots formed in the opposing end cap 840. This arrangement whereby the panels 820-832 are mounted to the end caps 800 and 840 to form the combination shown in FIG. 46 fixes the panels 820-832 to the end caps 800 and 840 in the angled position shown, and the panels 820-832 remain at these angles even when air or another gas is flowing through the filter in which the combination is mounted. Additional pleated panels, which are a mirror image of the panels 820-832 around the lateral center F2 of FIG. 49, mounts in the slots 805-811 and corresponding slots in the end cap 840. This may also be seen in FIG. 49, which is a schematic view to show the angles of all panels of the support backing 230 of FIG. 46.

Figure 49:
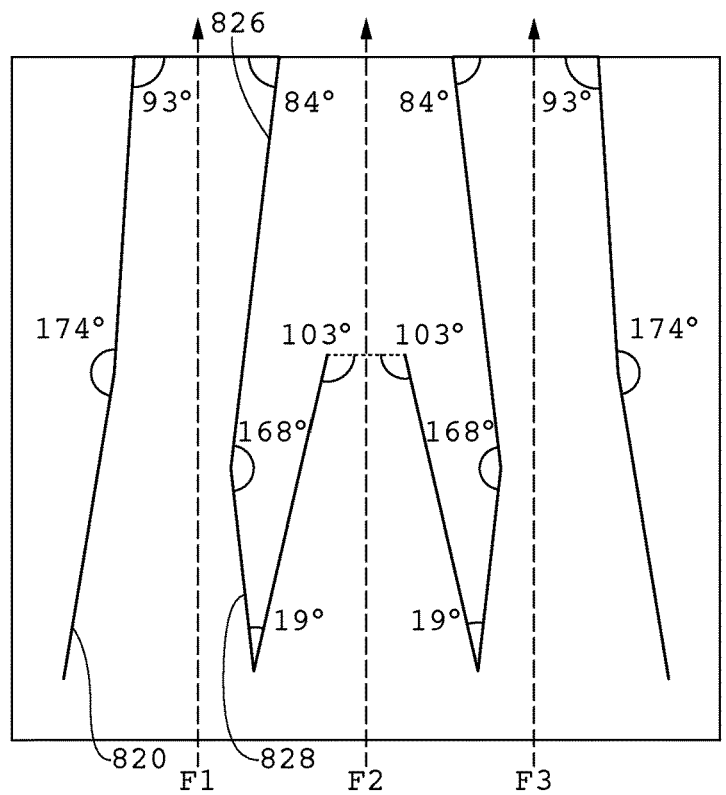
FIG. 49 is a schematic view illustrating one half of the angles between the panels of the embodiment of FIG. 46.
Figure 50:
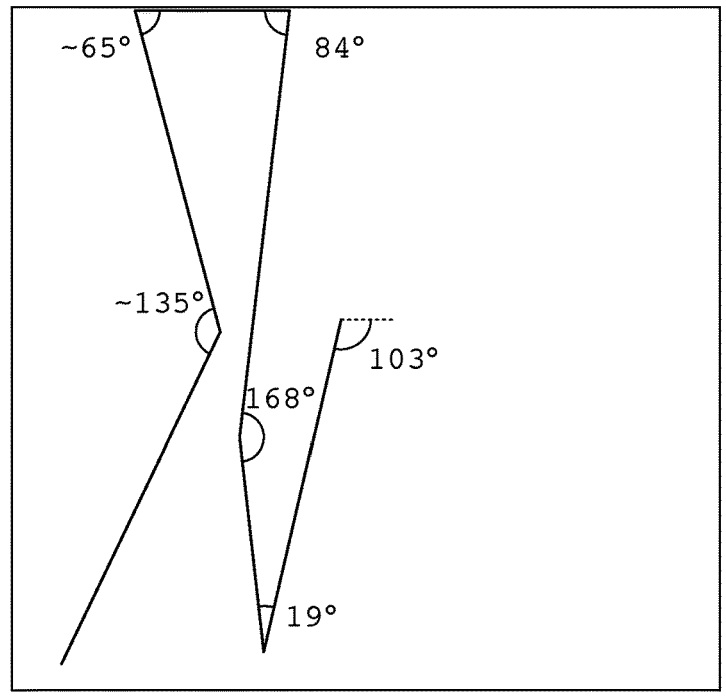
FIG. 50 is a schematic view illustrating one half of the panels of the embodiment of FIG. 46 at one extreme.
Figure 51:
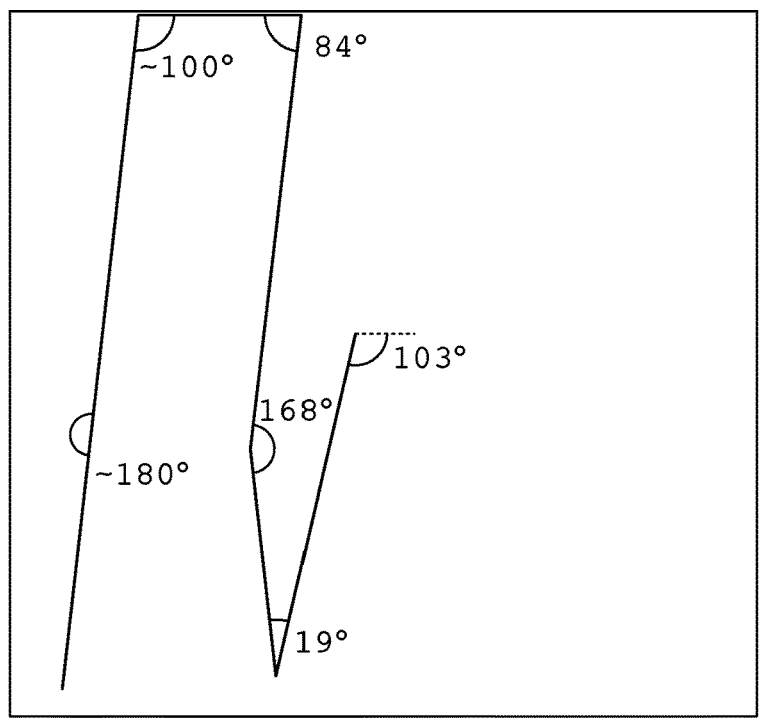
FIG. 51 is a schematic view illustrating one half of the panels of the embodiment of FIG. 46 at an extreme.
Figure 52:
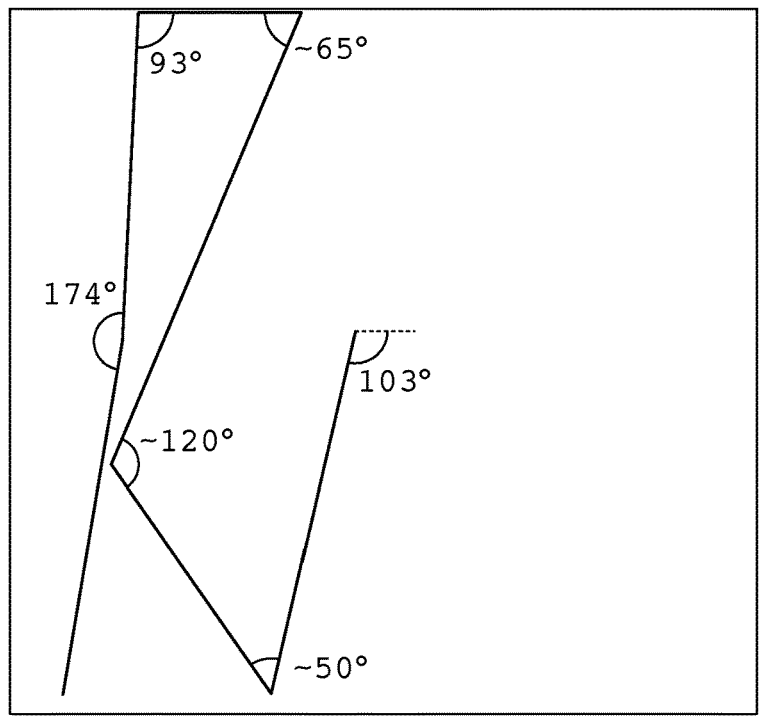
FIG. 52 is a schematic view illustrating one half of the panels of the embodiment of FIG. 46 at an extreme.
Figure 53:
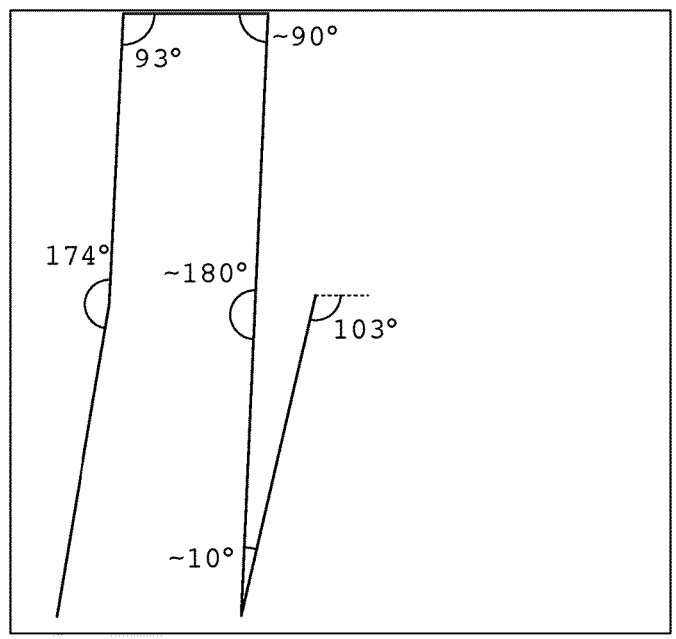
FIG. 53 is a schematic view illustrating one half of the panels of the embodiment of FIG. 46 at an extreme.

It will become apparent from FIGS. 48 and 49 that not all of the panels 820-832 have the same length from the upstream end to the downstream end of the end caps 800 and 840, which is the direction of gas flow, F (see FIG. 47), and which corresponds to the direction of the arrows F1, F2 and F3 in FIG. 49. This difference in length is apparent from the fact that the panel 820 is not the same length as the panel 828. Likewise, the panel 822 is not the same length as the panel 826. These panels may be the same length, but they need not be. Furthermore, the angle between the panels 820 and 822 is preferably about 174 degrees, as shown in FIG. 49, but may vary from about 135 to about 180 degrees, as shown in FIGS. 50 and 51. Still further, the angle between the panels 826 and 828 is preferably about 168 degrees, as shown in FIG. 48, but may vary from about 120 to about 180 degrees, as shown in FIGS. 52 and 53.

Whereas the positions of the panels in the embodiments of FIGS. 32-34 result in the particles of paint or other air-borne material directly striking a face of filtration material mounted on one of the pleated panels, the angling and sizes of the panels in the embodiment of FIGS. 46-53 will not cause the same phenomenon for all panels. As an example, because the relative angle of the panel 826 to the panel 828 is about 168 degrees, but no larger than 180 degrees, and because there is a non-zero degree angle between the panel 826 and the direction of flow, F2, of gas (see FIG. 49), a significant portion of the panel 826 does not receive particles of material directly striking the face of any filtration material mounted thereto. Indeed, many of the particles entering the chamber 850 (see FIG. 48) between the panels 820, 822, 824, 826 and 828 will strike the filtration material mounted on the panels 820, 822, 824 and 828. Few to no particles will strike the filtration material mounted on the panel 826, because of the angle of the panel 826 relative to the airflow direction, F2. The panels 820, 822, 824 and 828 are all angled to present a face of filtration material to the incoming airflow, F. However, the panel 826 is angled to extend behind the panel 828, thereby allowing the filtration material on the panel 826 to filter any matter that strikes it, but in a position that permits airflow through the filtration material on the panel 826 without a direct strike. Thus, the filtration material on the panel 826 will remain unclogged until all other surfaces of filtration material are more filled with particles. In this manner, a filter using the structure described will maintain a low pressure drop for a longer period than conventional filters.

One way of explaining this phenomenon is to point to the configuration of at least a segment of the panel 826, which has filtration material mounted to a side of the support backing 230 that faces away from the lateral center, F2. This panel 826 has an upstream end (near the panel 828) that is farther from the lateral center, F2 than the downstream end (near the panel 824. With this configuration, the filtration material mounted to the panel 826 is not facing the incoming gas flow, and therefore cannot receive a direct impact of gas and/or entrained particles, unless the gas flow curves around the panel 828. Curving of the flow is possible when the remainder of the filtration material is clogged with particles. Thus, the invention described provides a low pressure drop for a longer period than conventional filters. Of course, the stabilizing panels may be used with the structure shown and described in association with FIGS. 46-53.

The embodiment shown in FIGS. 46-53 has an upstream central portion that does not extend as far downstream as the lateral portions. This configuration permits panels adjacent the central portion at the downstream end to protrude toward the lateral center and angle away from facing the inlet side of the filter. The embodiment is preferably symmetrical about the lateral center (at F2 of FIG. 49), and the panels adjacent the downstream void created by the shorter central portion are angled with their filtration media pointed downstream, thereby avoiding a direct impact from the air and particles flowing into the filter. Thus, these downstream-pointing faces of the support backing face away from the lateral center and have an upstream end that is farther from the lateral center than the downstream end. It will become apparent that the panel 824, which is preferably perpendicular to the flow of air into the filter, has one end farther from the lateral center than the other. However, the panel 824 does not face away from the lateral center when it is perpendicular to the air flow.

The support backing 430 may be used with the end caps 800 and 840 in order to align each of the panels of the support backing 430 relative to one another and retain the panels in the aligned positions shown in FIG. 46. An alternative support backing embodiment is shown in FIGS. 54-57. It is contemplated that the support backings 900 and 900' with integrated webs may be used with the embodiment of FIGS. 46-53 so that end caps, such as the end caps 800 and 840, are not necessary. The support backing 900 is similar to the support backing 430 with regard to the material, the formation of openings therein for air or another gas to flow through, and the hinge lines formed therein to form preferential bending locations at the hinge lines. In addition to the similarities with the support backing 430, the support backing 900 has differences. Rather than being used with end caps as described above for the support backing 430, the support backing 900 has integrated webs 960, 961, 962, and 963. The mirror-image support backing 900' has corresponding integrated webs 960', 961', 962' and 963' (see FIG. 55). Each of the webs 960-963 and 960'-963' extend from a panel of the support backings 900 and 900', and may pivot or hinge relative to the panel. The webs 960-963 and 960'-963' may fasten to an adjacent web or panel of the support backing to maintain two panels that connect together thereby at a desirable angle. The webs 960-963 and 960'-963' are disposed on opposing panel ends in order to maintain panels at the desired relative angle at both ends of the support backing.

The web 960 may attach to the panel from which the web 961 extends, the web 961 may attach to the panel from which the web 963' extends. The web 963' attaches to the tabs 970 and 972 at the end of the support backing 900. The web 962 attaches to the single tab 974' on the support backing 900'. All of these webs lay on a single side. At the opposite end, the web 960' may attach to the panel from which the web 961' extends, the web 961' attaches to the panel from which the web 963' extends. The web 963 attaches to the tabs 970' and 972'on the support backing 900'. The web 962' attaches to the single tab 974 on the support backing 900 and this completes the other side. There is an optional folding structure sequence starting with the web 960 folding into 961 or 960' folding into 961' and working along the row. Webs 962' and 962 can be folded and act as a bridge whenever is convenient but the majority of the sections still follow the optimal cascading strategy.

Figure 55:
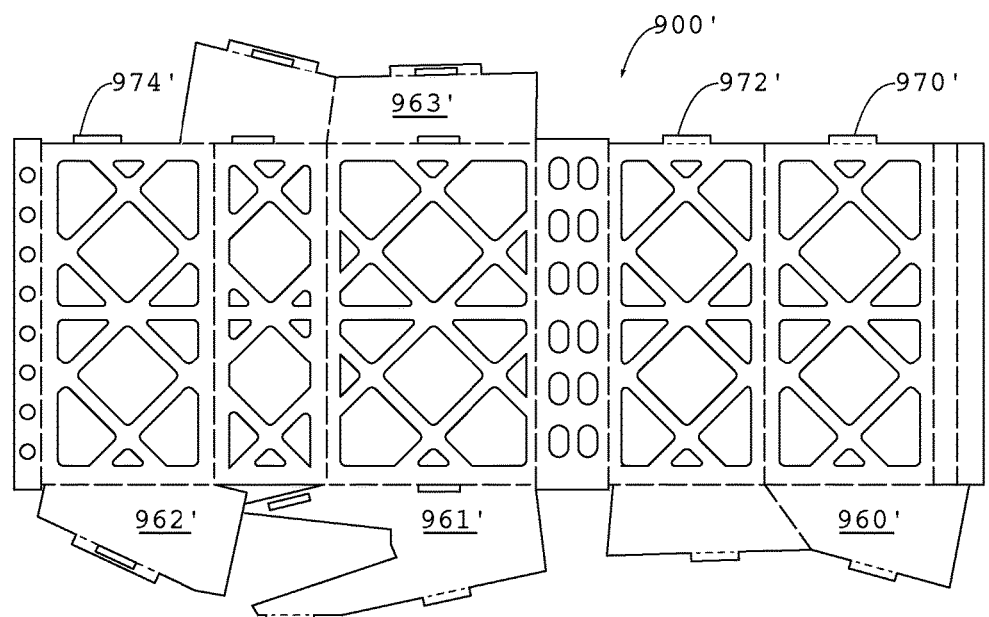
FIG. 55 is a top view illustrating an alternative support backing that is a mirror image of the structure shown in FIG. 54.
Figure 56:
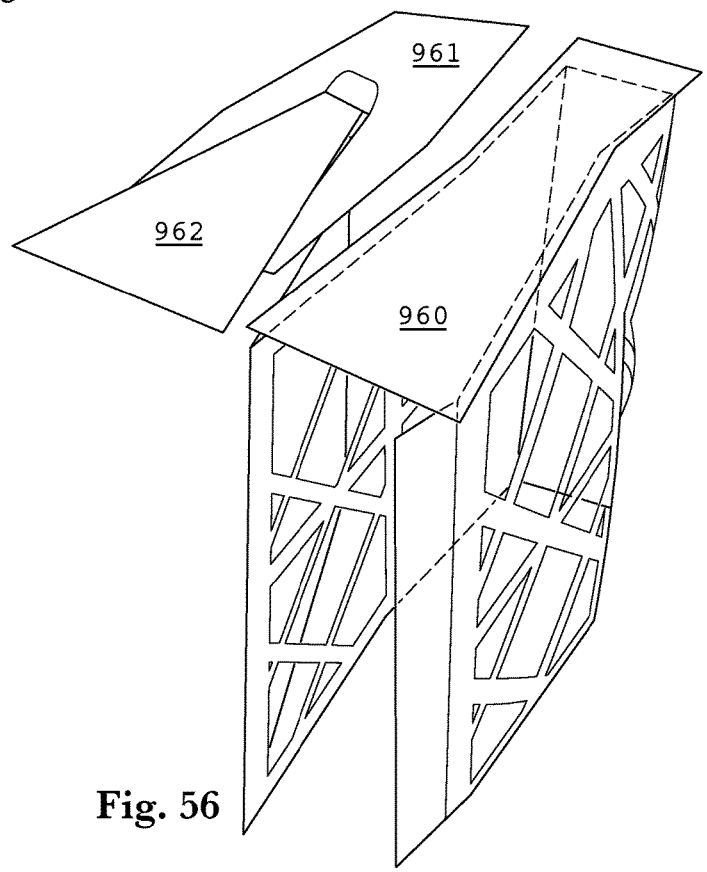
FIG. 56 is a top view in perspective illustrating the embodiment of FIG. 41 in an expanded configuration.
Figure 57:
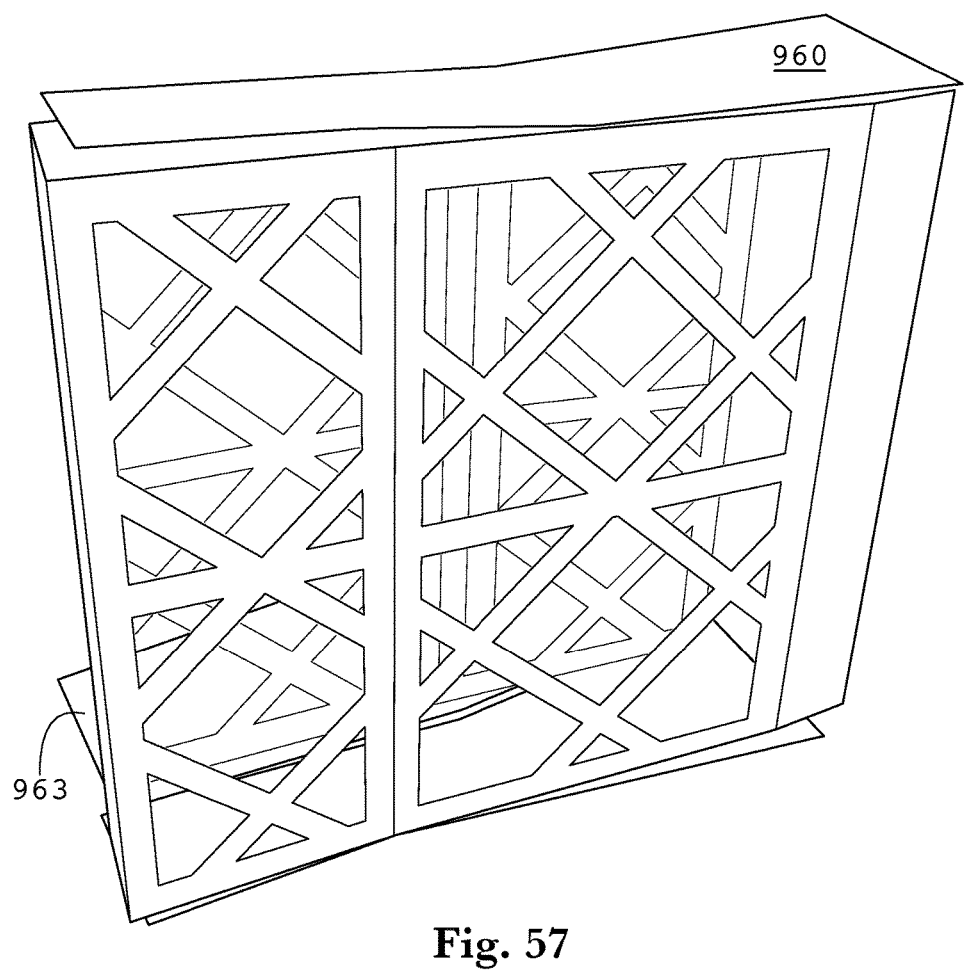
FIG. 57 is a side view in perspective illustrating the embodiment of FIG. 41 in an expanded configuration.

Like support 610, 900 is chiral in that to create a full support backing it may be combined with its mirror image 900' FIG. 55. As long as the support backing is constructed of a material that is symmetric on both faces, the same cut part can be used and the support backing may be considered identical, as its mirror image can be produced by flipping the support just as with the support backing 610. Note that the application of filtration media would induce chirality again, so the media must be applied to half of the panels turned 900 style and the other half to the 900' style. Of course, the support 900 could simply be made longer to have the same number of panels as the combination of panels 900 and 900', but this may affect the cost to manufacture and ship.

Figure 54:
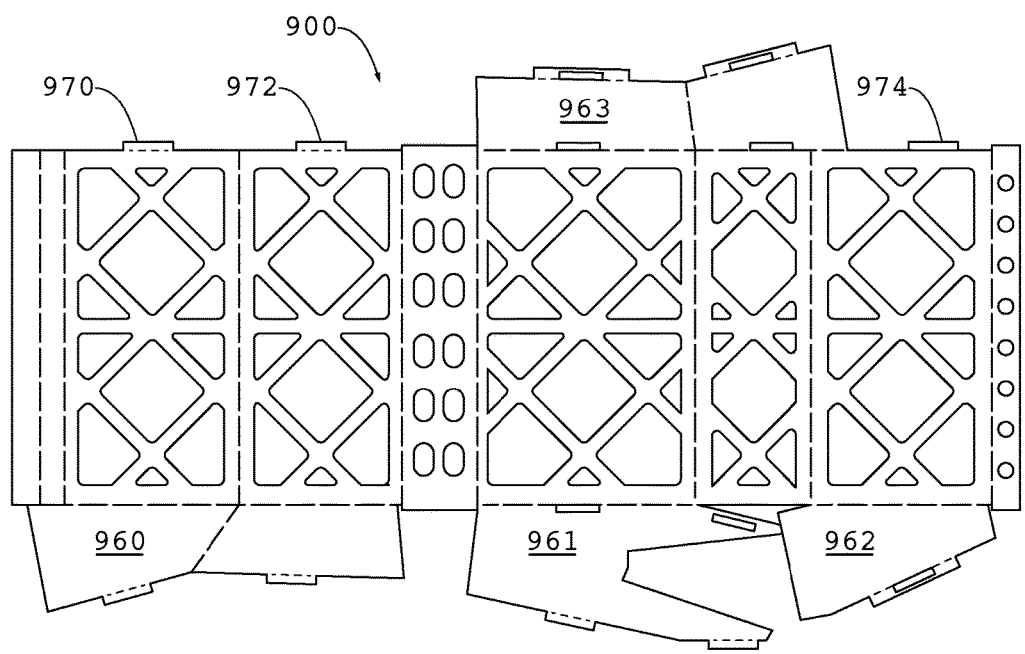
FIG. 54 is a top view illustrating an alternative support backing.

The complete support backing 900 (and identical support backing 900') begins by being manufactured flat as shown in FIGS. 54 and 55, and may then be collapsed to a small size by simply folding along corresponding hinge lines between the panels. Collapse of the support backing 900 may occur before or after a filtration material (not shown) is attached thereto. Once it is desired to expand the support backing 900 (and the identical support backing 900') and insert it into a housing, such as the housing 50, the support backing 900 is folded into the configuration shown in FIG. 57, and the webs are folded over as described above.

The above-described filters and filter components may be used as shown and described, or they may be modified. One example of a modification is the use of a single filter alone as shown and described, or the use of multiple of the filters shown and described. Alternatively, one half (or any portion) of the filters shown and described may be combined with a complete filter as shown and described to make a longer filter. Any such combination is contemplated by the present invention.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A filter for a spray coating system, the filter comprising:
    (a) a housing including a peripheral sidewall having an inlet opening on a first side and an outlet opening on a second, opposite side of the housing, the inlet and outlet openings providing substantially no resistance to the flow of gas along a flow path extending through the housing from the inlet opening to the outlet opening;
    (b) a support backing disposed within the peripheral sidewall between the inlet and outlet openings, the support backing having at least a first substantially planar panel joined at a first edge to a first edge of a second substantially planar panel at a predetermined, non-parallel angle thereto, said first and second panels having openings formed therethrough to provide substantially no resistance to the flow of gas through the panels, wherein a hinge is formed where the first edge of the first panel is joined to the first edge of the second panel, whereby the support backing may be collapsed by pivoting said first panel along the hinge relative to the second panel;
    (c) a filtration material attached to the support backing; and
    (d) first and second end caps mounted within the housing to the support backing at opposite ends of the first and second panels and on opposite sides of the flow path transverse to the first edges of the first and second substantially planar panels, for maintaining said at least first and second substantially planar panels at the predetermined angle, the end caps having a plurality of preferential hinge lines formed thereon to permit the first and second end caps to collapse to a pleated configuration when the attached support backing is collapsed.

2. The filter in accordance with claim 1, further comprising:
    (a) a first stabilizing panel attached to the first end cap by a first hinge at a first edge of the first end cap, the first stabilizing panel having a distal edge; and
    (b) a second stabilizing panel attached to the first end cap by a second hinge at a second, opposite edge of the first end cap, the second stabilizing panel having a distal edge, wherein the first and second stabilizing panels fasten together near the respective distal edges and, when positioned substantially parallel to the first end cap, apply an expanding force to the first end cap.

3. The filter in accordance with claim 2, further comprising:
    (a) a third stabilizing panel attached to the second end cap by a first hinge at a first edge of the second end cap, the third stabilizing panel having a distal edge; and
    (b) a fourth stabilizing panel attached to the second end cap by a second hinge at a second, opposite edge of the second end cap, the fourth stabilizing panel having a distal edge, wherein the third and fourth stabilizing panels fasten together near the respective distal edges and, when positioned substantially parallel to the second end cap, apply an expanding force to the second end cap.

4. The filter in accordance with claim 1, further comprising:
    (a) a first wing extending from an edge the first panel adjacent, but unattached, to the housing sidewall and pivotably attached to the first panel along a pivot axis that is (b) a second wing extending from an edge of the second panel adjacent, but unattached, to the housing sidewall and pivotably attached to the second panel along a pivot axis that is substantially parallel to the housing sidewall; and (c) a filtration material attached to the panels and the wings and extending across the openings in the panels, wherein the first and second wings are configured so that the force of the flow of air through the housing seats the first and second wings against opposite housing sidewalls.

5. A filter for a spray coating system, the filter comprising:

(a) a housing including a peripheral sidewall having an inlet opening on a first side and an outlet opening on a second, opposite side of the housing, the inlet and outlet openings providing substantially no resistance to the flow of gas along a flow path extending through the housing from the inlet opening to the outlet opening;

(b) a collapsed support backing having at least a first substantially planar panel joined at a first edge to a first edge of a second substantially planar panel, said first and second panels having openings formed therethrough to provide substantially no resistance to the flow of gas through the panels, wherein a hinge is formed where the first edge of the first panel is joined to the first edge of the second panel, whereby the support backing may be expanded by pivoting said first panel along the hinge relative to the second panel to align the first panel at a predetermined, non-parallel angle relative to the second panel;

(c) a filtration material attached to the support backing; and (d) first and second pleated end caps mounted to the support backing at opposite ends of the first and second panels for maintaining said at least first and second panels at the predetermined angle when the end caps and support backing are expanded to an operable configuration within the housing, the end caps having a plurality of rigid pleat regions with preferential hinge lines at edges thereof that permit the first and second end caps to attain a substantially planar configuration when the attached support backing is substantially expanded by pivoting said first panel along the hinge relative to the second panel to a pre-determined, non-parallel angle.

6. The filter in accordance with claim 5, further comprising:

(a) a first stabilizing panel attached to the first end cap by a first hinge at a first edge of the first end cap, the first stabilizing panel having a distal edge; and (b) a second stabilizing panel attached to the first end cap by a second hinge at a second, opposite edge of the first end cap, the second stabilizing panel having a distal edge, wherein the first and second stabilizing panels are configured to fasten together near the respective distal edges and, when positioned substantially parallel to the first end cap, apply an expanding force to the first end cap.

7. The filter in accordance with claim 6, further comprising:

(a) a third stabilizing panel attached to the second end cap by a first hinge at a first edge of the second end cap, the third stabilizing panel having a distal edge; and (b) a fourth stabilizing panel attached to the second end cap by a second hinge at a second, opposite edge of the second end cap, the stabilizing panel having a distal edge, wherein the third and fourth stabilizing panels are configured to fasten together near the respective distal edges and, when positioned substantially parallel to the second end cap, apply an expanding force to the second end cap.

8. A method of making a gas filter comprising the steps of:

(a) expanding a support backing from a compressed state, the support backing having at least a first substantially planar panel joined at a first edge to a first edge of a second substantially planar panel, said first and second panels having openings formed therethrough to provide substantially no resistance to the flow of gas through the panels and a filtration material attached to the support backing;

(b) expanding first and second pleated end caps mounted to the support backing at opposite ends of the first and second panels, the end caps having a plurality of rigid pleat regions with preferential hinge lines at edges thereof that permit the first and second end caps to attain a substantially planar configuration when the attached support backing is expanded by pivoting said first panel along the hinge relative to the second panel to a predetermined, non-parallel angle, the end caps maintaining said first and second panels at the predetermined angle when the end caps and support backing are substantially expanded to an operable configuration; and (c) inserting the support backing and end caps into a housing including a peripheral sidewall having an inlet opening on a first side and an outlet opening on a second, opposite side of the housing, the inlet and outlet openings providing substantially no resistance to the flow of gas through the housing, the support backing being inserted within the peripheral sidewall between the inlet and outlet openings.

9. The method in accordance with claim 8, further comprising:

(a) fastening a first stabilizing panel to a second stabilizing panel and disposing the first and second stabilizing panels substantially parallel to the first end cap, thereby applying an expanding force to the first end cap; and (b) fastening a third stabilizing panel to a fourth stabilizing panel and disposing the third and fourth stabilizing panels substantially parallel to the second end cap, thereby applying an expanding force to the second end cap.

10. A filter for a spray coating system, the filter comprising:

(a) a housing including a peripheral sidewall having an inlet opening on a first side for receiving a flowing gas and an outlet opening on a second, opposite side of the housing, the inlet and outlet openings providing substantially no resistance to the flow of gas along a flow path extending through the housing from the inlet opening to the outlet opening; and (b) a support backing disposed within the peripheral sidewall, the support backing having an upstream side, at least most of which faces the inlet opening, a downstream side, at least most of which faces the outlet opening, and a lateral center of the support backing, the support backing having at least a first substantially planar panel joined at a first edge to a first edge of a second substantially planar panel at a predetermined, non-parallel angle thereto, said first and second panels having openings formed therethrough to provide substantially no resistance to the flow of gas through the panels, wherein the first substantially planar panel has filtration media mounted to a surface that faces away from the lateral center and at least a segment of the first substantially planar panel has an upstream end that is farther from the lateral center than a downstream end.

11. The filter in accordance with claim 10, wherein the support backing further comprises at least a third substantially planar panel joined at a first edge to a first edge of a fourth substantially planar panel at a predetermined, non-parallel angle thereto, said third and fourth panels having openings formed therethrough to provide substantially no resistance to the flow of gas through the panels, wherein the third substantially planar panel has filtration media mounted to a surface that faces away from the lateral center and at least a segment of the third substantially planar panel has an upstream end that is farther from the lateral center than a downstream end.

12. The filter in accordance with claim 10, further comprising first and second end caps mounted to the support backing at opposite ends of the first and second panels transverse to the first edges of the first and second panels, for maintaining said at least first and second panels at the predetermined angle.

13. The filter in accordance with claim 12, wherein the end caps have a plurality of preferential hinge lines formed thereon to permit the first and second end caps to collapse to a pleated configuration.

14. The filter in accordance with claim 13, further comprising:
(a) a first stabilizing panel attached to the first end cap by a first hinge at a first edge of the first end cap, the first stabilizing panel having a distal edge; and
(b) a second stabilizing panel attached to the first end cap by a second hinge at a second, opposite edge of the first end cap, the second stabilizing panel having a distal edge, wherein the first and second stabilizing panels fasten together near the respective distal edges and, when positioned substantially parallel to the first end cap, apply an expanding force to the first end cap.

15. The filter in accordance with claim 14, further comprising:
(a) a third stabilizing panel attached to the second end cap by a first hinge at a first edge of the second end cap, the third stabilizing panel having a distal edge; and
(b) a fourth stabilizing panel attached to the second end cap by a second hinge at a second, opposite edge of the second end cap, the fourth stabilizing panel having a distal edge, wherein the third and fourth stabilizing panels fasten together near the respective distal edges and, when positioned substantially parallel to the second end cap, apply an expanding force to the second end cap.

16. The filter in accordance with claim 10, further comprising:
(a) at least a first web pivotably mounted at a first end of at least one of the first and second panels, and attached to the other of the first and second panels transverse to the first edges of the first and second panels for maintaining said at least first and second panels at the predetermined angle at the first end of the first and second panels; and
(b) at least a second web pivotably mounted at a second end of at least one of the first and second panels, and attached to the other of the first and second panels transverse to the first edges of the first and second panels for maintaining said at least first and second panels at the predetermined angle at the second end of the first and second panels, wherein the first and second webs are on opposite sides of the flow path.

17. A filter for a spray coating system, the filter comprising:
(a) a housing including a peripheral sidewall having an inlet opening on a first side and an outlet opening on a second, opposite side of the housing, the inlet and outlet openings providing substantially no resistance to the flow of gas along a flow path extending through the housing from the inlet opening to the outlet opening;
(b) a support backing disposed within the peripheral sidewall between the inlet and outlet openings, the support backing having at least a first substantially planar panel joined at a first edge to a first edge of a second substantially planar panel at a predetermined, non-parallel angle thereto, said first and second panels having openings formed therethrough to provide substantially no resistance to the flow of gas through the panels, wherein a hinge is formed where the first edge of the first panel is joined to the first edge of the second panel, whereby the support backing may be collapsed by pivoting said first panel along the hinge relative to the second panel;
(c) a filtration material attached to the support backing;
(d) at least a first web pivotably mounted at a first end of at least one of the first and second panels, and attached to the other of the first and second panels transverse to the first edges of the first and second substantially planar panels for maintaining said at least first and second substantially planar panels at the predetermined angle at the first end of the first and second panels; and
(e) at least a second web pivotably mounted at a second end of at least one of the first and second panels, and attached to the other of the first and second panels transverse to the first edges of the first and second substantially planar panels for maintaining said at least first and second substantially planar panels at the predetermined angle at the second end of the first and second panels, wherein the first and second webs are on opposite sides of the flow path.

18. The filter in accordance with claim 17, wherein the first and second webs have a plurality of preferential hinge lines formed thereon to permit the first and second webs to collapse into a pleated shape when the attached support backing is collapsed.

19. A filter for a spray coating system, the filter comprising:
(a) a housing including a peripheral sidewall having an inlet opening on a first side and an outlet opening on a second, opposite side of the housing, the inlet and outlet openings providing substantially no resistance to the flow of gas along a flow path extending through the housing from the inlet opening to the outlet opening;
(b) a collapsed support backing having at least a first substantially planar panel joined at a first edge to a first edge of a second substantially planar panel, said first and second panels having openings formed therethrough to provide substantially no resistance to the flow of gas through the panels, wherein a hinge is formed where the first edge of the first panel is joined to the first edge of the second panel, whereby the support backing may be expanded by pivoting said first panel along the hinge relative to the second panel to align the first panel at a predetermined, non-parallel angle relative to the second panel;
(c) a filtration material attached to the support backing; and
(d) at least a first web pivotably mounted at a first end of at least one of the first and second panels, and attached to the other of the first and second panels transverse to the first edges of the first and second substantially planar panels for maintaining said at least first and second substantially planar panels at the predetermined angle at the first end of the first and second panels; and (e) at least a second web pivotably mounted at a second end of at least one of the first and second panels, and attached to the other of the first and second panels transverse to the first edges of the first and second substantially planar panels for maintaining said at least first and second substantially planar panels at the predetermined angle at the second end of the first and second panels, wherein the first and second webs are on opposite sides of the flow path.

20. A method of making a gas filter comprising the steps of:

(a) expanding a support backing from a compressed state, the support backing having at least a first substantially planar panel joined at a first edge to a first edge of a second substantially planar panel, said first and second panels having openings formed therethrough to provide substantially no resistance to the flow of gas through the panels and a filtration material attached to the support backing;

(b) attaching a first web, which is pivotably mounted at a first end of at least one of the first and second panels, to the other of the first and second panels transverse to the first edges of the first and second substantially planar panels for maintaining said at least first and second substantially planar panels at the predetermined angle at the first end;

(c) attaching a second web, which is pivotably mounted at a second end of at least one of the first and second panels, to the other of the first and second panels transverse to the first edges of the first and second substantially planar panels for maintaining said at least first and second substantially planar panels at the predetermined angle at the second end, wherein the first and second webs are on opposite sides of the flow path;

(d) expanding a housing from a compressed state, the housing including a peripheral sidewall having an inlet opening on a first side and an outlet opening on a second, opposite side of the housing, the inlet and outlet openings providing substantially no resistance to the flow of gas through the housing; and (e) inserting the support backing into the housing within the peripheral sidewall between the inlet and outlet openings.

21. The method in accordance with claim 20, wherein the step of attaching the first web to one of the first and second panels is carried out before the second web is pivoted relative to the panel to which the second web is mounted.

* * * * *

UNITED STATES PATENT AND TRADEMARK OFFICE
CERTIFICATE OF CORRECTION

PATENT NO. : 9,993,835 B2  
APPLICATION NO. : 15/417817  
DATED : June 12, 2018  
INVENTOR(S) : Slama et al.

Page 1 of 1

It is certified that error appears in the above-identified patent and that said Letters Patent is hereby corrected as shown below:

In the Claims

Column 26, under Claim 4(a), Line 67:  
Need to add "substantially parallel to the housing sidewall;"

Column 27, under Claim 7(b), Line 66:  
Need to add the word "fourth" between the words "the" and "stabilizing"

Signed and Sealed this  
Twenty-fifth Day of September, 2018

Andrei Iancu  
*Director of the United States Patent and Trademark Office*